United States Patent
Hayashiya et al.

(10) Patent No.: US 7,321,006 B2
(45) Date of Patent: Jan. 22, 2008

(54) ADMIXTURE FOR CEMENT

(75) Inventors: Toshio Hayashiya, Toyono-gun (JP); Tomiyasu Ueta, Suita (JP); Tsutomu Yuasa, Osaka (JP); Tsuyoshi Hirata, Kobe (JP); Hiroshi Yamazaki, Sakai (JP)

(73) Assignee: Nippon Shokubai Co., Ltd., Osaka (JP)

( * ) Notice: Subject to any disclaimer, the term of this patent is extended or adjusted under 35 U.S.C. 154(b) by 504 days.

(21) Appl. No.: 11/026,995

(22) Filed: Dec. 31, 2004

(65) Prior Publication Data

US 2005/0182162 A1    Aug. 18, 2005

(30) Foreign Application Priority Data

Jan. 6, 2004    (JP) ............................. 2004-000933
Mar. 2, 2004    (JP) ............................. 2004-057996

(51) Int. Cl.
    *C04B 24/26*    (2006.01)
(52) U.S. Cl. ............... 524/5; 524/4; 524/556; 524/558; 526/79; 526/240; 526/318.41
(58) Field of Classification Search ............... 524/4–5, 524/556, 558; 526/79, 240, 318.41
See application file for complete search history.

(56) References Cited

U.S. PATENT DOCUMENTS

| 5,925,184 A | 7/1999 | Hirata et al. |
| 6,187,841 B1 | 2/2001 | Tanaka et al. |
| 6,376,581 B1 | 4/2002 | Tanaka et al. |
| 6,946,505 B2 * | 9/2005 | Yuasa et al. .................... 524/4 |
| 2003/0019401 A1 | 1/2003 | Schwartz et al. |
| 2003/0094121 A1 | 5/2003 | Yuasa et al. |
| 2003/0199616 A1 | 10/2003 | Yamashita et al. |

FOREIGN PATENT DOCUMENTS

| EP | 1 344 754 A2 | 9/2003 |
| JP | 6-279082 A | 10/1994 |
| JP | 9-86990 A | 3/1997 |
| JP | 9-286645 A | 11/1997 |
| JP | 2000-109357 A | 4/2000 |
| JP | 2001-89212 A | 4/2001 |
| JP | 2003-206169 A | 7/2003 |
| JP | 2003-221266 A | 8/2003 |
| JP | 2003-277115 A | 10/2003 |
| JP | 2003-335562 A | 11/2003 |
| JP | 2003-335566 A | 11/2003 |
| JP | 2004-277280 A | 10/2004 |
| WO | WO 02/083594 A1 | 10/2002 |
| WO | WO 02/096823 A1 | 12/2002 |

* cited by examiner

*Primary Examiner*—Peter Szekely

(57) ABSTRACT

There are provided an admixture for cement which enhances water reducing property and flowability of a cement composition, and is excellent in slump retaining performance to retain the flowability with time, a polycarboxylic acid-based polymer for an admixture for cement suitable therefor, a producing method thereof, and a cement composition. One admixture for cement of the present invention contains copolymers (A) and (B) as an essential component, weight average molecular weights (AMw and BMw) of copolymers (A) and (B) are AMw>BMw, or peaktop molecular weights (AMp and BMp) of copolymers (A) and (B) are AMp>BMp. Another admixture for cement of the present invention contains a polycarboxylic acid-based polymer having a lower molecular weight side area ratio P of 50 to 87%.

14 Claims, 2 Drawing Sheets

ADMIXTURE FOR CEMENT

BACKGROUND OF THE INVENTION

A. Technical Field

The present invention relates to an admixture for cement, a polycarboxylic acid-based polymer for an admixture for cement, and a producing method thereof, and a cement composition. More particularly, the present invention relates to an admixture for cement excellent in slump retaining performance, which enhances flowability, and retains the flowability with time, in a so-called cement composition such as a cement paste, a mortar and a concrete, and a polycarboxylic acid-based polymer for an admixture for cement suitable therefor, and a producing method thereof, and a cement composition.

B. Background Art

Since a cement composition (also referred to as cement blend) gives a hardened cement excellent in a strength and durability, it is widely used in utility such as a building outer wall material and a building structure. Examples of such the cement composition include a cement paste obtained by adding water to a cement, a mortar obtained by mixing therein a sand which is a fine aggregate, and a concrete obtained by further mixing therewith a small stone which is a coarse aggregate and, usually, in order to enhance air-entraining property and flowability, an admixture for cement is added and, in recent years, its importance has been recognized, and technological innovation is being performed vigorously.

A role of an admixture for cement is to exert sufficient dispersibility to maintain its flowability and execution property even when water in a cement composition is decreased, realize improvement in durability and a strength due to water reduction and, at the same time, retain stable dispersibility with time to acquire a better cement composition. And, in the recent concrete art, a concrete which realizes such the performance is strongly required and, in order to attain this, reduction in a unit water amount and prevention of reduction in flowability are an important theme.

Among various admixture for cements, in particular, a polycarboxylic acid-based cement dispersant is advantageous as compared with other cement dispersants such as a naphthalene-based cement dispersant in that it exerts high dispersing performance and, as such the cement dispersant, a cement dispersant containing a copolymer consisting of a specified unsaturated polyalkylene glycol-based monomer and a (meth)acrylic acid-based monomer has been proposed (for example, see JP-A No. 9-86990).

However, these polycarboxylic acid-based cement dispersants have not completely overcome reduction in dispersing performance due to passage of a time yet and, further, in a high water reduction rate region necessary for a high strength concrete, there arises a problem such as reduction in workability of a concrete composition. That is, under current circumstances, in a high water reduction rate region, flowability of a concrete is reduced, a viscosity becomes high particularly under high shear, a pump load at pumping under pressure becomes extremely large, and harmful influence is caused in pumping under pressure. In particular, when an air temperature is 15° C. or lower in winter, a temperature of a concrete is reduced like an air temperature, a viscosity of a concrete becomes high, workability is remarkably reduced, initial dispersibility of a cement dispersant is reduced, and filling property into a mold is deteriorated, resulting in remarkable damage of workability. As a method of retaining flowability, that is, preventing reduction in slump, there is an example in which improvement was tried paying attention to a length of a polyalkylene chain (for example, see JP-A No. 9-286645), but a use amount tends to increase, and an admixture for cement which is used at a small amount, and retains flowability for a long term is highly desired.

SUMMARY OF THE INVENTION

A. Object of the Invention

The present invention was done in view of the aforementioned circumstances, and an object of the present invention is to provide an admixture for cement which enhances water reducing property and flowability of a cement composition, and retains its flowability with time, and is excellent in slump retaining performance, and workability, a polycarboxylic acid-based polymer for an admixture for cement suitable therefor, and a producing method thereof, and a cement composition.

B. Disclosure of the Invention

In order to solve the aforementioned problems, the present inventors intensively studied.

As a result, the present inventors found that an admixture for cement containing specified two kinds of copolymers as an essential component, or an admixture for cement containing a polycarboxylic acid-based polymer showing a specified GPC chart as an essential component enhances water reducing property and flowability of a cement component, and a cement composition which retains its flowability with time, and is excellent in slump retaining performance and, further, workability is obtained.

That is, an admixture for cement of the present invention is an admixture for cement containing a copolymer (A) and a copolymer (B) as an essential component, and is characterized in that: both of the copolymer (A) and the copolymer (B) contain 2 to 90% by mass of a constitutional site (I) represented by the general formula (1) in each copolymer, and the copolymer (A) and the copolymer (B) satisfy the following both conditions shown in a) and b).

a) A content (IA) of a constitutional site (I) contained in the copolymer (A) and a content (IB) of a constitutional site (I) contained in the copolymer (B) are 12≧(IA-IB)≧0, or 12≧(IB-IA)≧0 (IA represents a content (% by mass) of a constitutional site (I) contained in the copolymer (A) when a whole copolymer (A) is 100% by mass, and IB represents a content (% by mass) of a constitutional site (I) contained in the copolymer (B) when a whole copolymer (B) is 100% by mass).

b) A weight average molecular weight (AMw) of the copolymer (A) and a weight average molecular weight (BMw) of the copolymer (B) are AMw>BMw, or a peaktop molecular weight (AMp) of the copolymer (A) and a peak-top molecular weight (BMp) of the copolymer (B) are AMp>BMp.

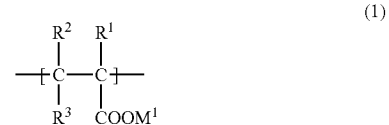

(wherein $R^1$, $R^2$ and $R^3$ are the same or different, and represent a hydrogen atom, a methyl group or —$(CH_2)_Z$COOM$^2$, Z represents a number of 0 to 2, wherein —$(CH_2)_Z$COOM$^2$ may form an anhydride with —COOM$^1$ or —$(CH_2)$ $_Z$COOM$^2$, and M$^1$ and M$^2$ are the same or different, and represent a hydrogen atom, an alkali metal atom, an alkaline earth metal atom, an ammonium group or an organic amine group)

A polycarboxylic acid-based polymer for the admixture for cement of the present invention is characterized in that a lower molecular weight side area ratio P defined by the following (1) to (6) is 50 to 87%.

(1) Measurement by gel permeation chromatography (GPC) is performed, and a GPC chart is obtained.

(2) A baseline of a GPC chart is drawn, and an intersection point between a higher molecular weight side and a baseline of a GPC chart is expressed by Lh, and an intersection point between a lower molecular weight side and a baseline of a OPC chart is expressed by Ln.

(3) An intersection point between a line which passes through a peak Mp (when there are plural peaks, a peak on a lowest molecular weight side) of a GPC chart and is vertical to a baseline, and a baseline is expressed by Lp.

(4) A middle point between Lp and Lh is expressed by Lm.

(5) An area of a side which is of a lower molecular weight than Lp in a GPC chart is expressed by P0, and an area of a side which is of a higher molecular weight than Lm in a GPC chart is expressed by Q0.

(6) A lower molecular weight side area ratio P (%) is defined as P=(P0×100)/(P0+Q0).

Another admixture for cement of the present invention contains a polycarboxylic acid-based polymer for the admixture for cement of the present invention as an essential component.

A cement composition of the present invention contains the admixture for cement of the present invention, a cement and water as an essential component.

A producing method of a polycarboxylic acid-based polymer for an admixture for cement of the present invention is a producing method of a polycarboxylic acid-based polymer of the present invention by radical-polymerizing a monomer component containing a monomer (I-M) represented by the general formula (3) as an essential component, and is characterized by comprising the following steps of: supplying a part of the monomer component together with a chain transfer agent into a reaction system and, thereafter, supplying a remainder of the monomer component without a chain transfer agent into a reaction system.

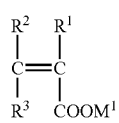
(3)

(wherein R$^1$, R$^2$ and R$^3$ are the same or different, and represent a hydrogen atom, a methyl group or —(CH$_2$)$_Z$COOM$^2$, Z represents a number of 0 to 2, wherein —(CH$_2$)$_Z$COOM$^2$ may form an anhydride with —COOM$^1$ or —(CH$_2$)$_Z$COOM$^2$, and M$^1$ and M$^2$ are the same or different, and represent a hydrogen atom, an alkali metal atom, an alkaline earth metal atom, an ammonium group or an organic amino group)

Another producing method of a polycarboxylic acid-based polymer for another admixture for cement of the present invention is a producing method of a polycarboxylic acid-based polymer for an admixture for cement of the present invention by radical-polymerizing a monomer component containing a monomer (I-M) represented by the general formula (3) as an essential component, and is characterized by comprising the following steps of: supplying a part of the monomer component together with an amount (TR-1) corresponding to its 0 to 20% by mass of a chain transfer agent into a reaction system and, thereafter, supplying a remainder of the monomer component together with an amount (TR-2) corresponding to its 1 to 50% by mass of a chain transfer agent into a reaction system.

A weight average molecular weight and a peaktop molecular weight used in the present invention are measured by gel permeation chromatography (hereinafter, referred to as "GPC"). A peaktop molecular weight in the present invention represents a molecular weight corresponding to a highest position in a curve plotted in a GPC chart.

DETAILED DESCRIPTION OF THE INVENTION

Figure 1:
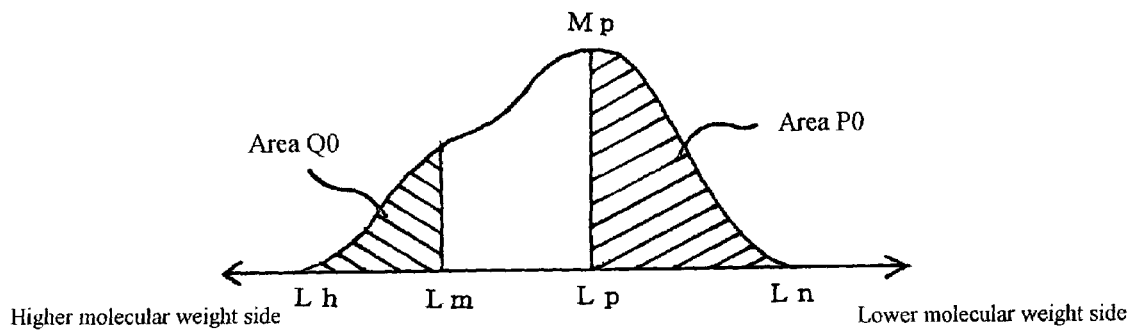
FIG. 1 is a GPC chart view (in the case of one peak) for explaining a lower molecular weight side area ratio P defined in the present invention.

The present invention will be explained in detail below.

The admixture for cement of the present invention contains the following (a) or (b) as a polymer for an admixture for cement, as an essential component.

(a) Specified two kinds of copolymers (b) Polycarboxylic acid-based polymer showing a specified GPC chart First, these polymers for an admixture for cement (a) and (b) will be described in detail below and, thereafter, the admixture for cement and the cement composition of the present invention will be described in detail.

[Polymer for Admixture for Cement (a)]

A polymer for an admixture for cement (a) which can be contained in the admixture for cement of the present invention as an essential component, consists of a copolymer (A) and a copolymer (B).

Both of the copolymer (A) and the copolymer (B) are a copolymer having 2 to 90% by mass of a constitutional site (I) represented by the general formula (1) in each copolymer, and a constitutional site (I) constituting the copolymer (A) and a constitutional component (I) constituting the copolymer (B) may be the same or different, and one kind or two or more kinds of constitutional sites (I) constituting each copolymer may be used.

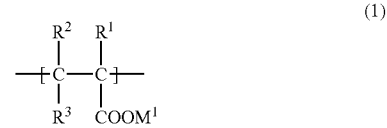
(1)

In the formula, R$^1$, R$^2$ and R$^3$ are the same or different, and represent a hydrogen atom, a methyl group or —(CH$_2$)$_Z$COOM$^2$, Z represents a number of 0 to 2, wherein —(CH$_2$)$_Z$COOM$^2$ may form an anhydride with —COOM$^1$ or —(CH$_2$)

$_2COOM^2$, and $M^1$ and $M^2$ are the same or different, and represent a hydrogen atom, an alkali metal atom, an alkaline earth metal atom, an ammonium group or an organic amine group.

Letting a whole copolymer (A) to be 100% by mass, a ratio of a constitutional site (I) contained therein to be IA (% by mass), a whole copolymer (B) to be 100% by mass, and a ratio of a constitutional site (I) contained therein to be IB (% by mass), 12>(IA-IB)≧0, or 12≧(IB-IA)≧0, preferably 8≧(IA-IB)≧0, or 8≧(IB-IA)≧0, further preferably 4≧(IA-IB)≧0, or 4≧(IB-IA)≧0.

Letting a mole number of a constitutional site (I) contained in 100 g of the copolymer (A) to be IAL, and a mole number of a constitutional site (I) contained in 100 g of a copolymer (B) to be IBL, preferably 0.11≧(IAL-IBL)≧0, or 0.11≧(IBL-IAL)≧0, further preferably 0.07≧(IAL-IBL)≧0, or 0.07≧(IBL-IAL)≧0, more preferably 0.04≧(IAL-IBL)≧0, or 0.04≧(IDL-IAL)≧0.

A constitutional site (I) is a site exerting adsorbing action on a cement and, when a difference in amounts of constitutional sites contained in the copolymer (A) and the copolymer (B) becomes great exceeding the aforementioned range, in order to manifest flowability of a cement composition, a use amount is increased and, further, hardening delay is caused in some cases, being disadvantageous.

A constitutional site (I) is contained at 2 to 90% by mass in the copolymer (A), and at 2 to 90% by mass in the copolymer (B), preferably at 10 to 50% by mass in the copolymer (A) and/or the copolymer (B), further preferably at 15 to 30% by mass. When an amount exceeds this range, then, in order to manifest flowability of a cement composition, a use amount is increased and, further, hardening delay is caused in some cases, being disadvantageous.

It is necessary that a molecular weight of the copolymer (A) and a molecular weight of the copolymer (B) have specified relationship. That is, in a weight average molecular weight (AMw) of the copolymer (A) and a weight average molecular weight (BMw) of the copolymer (B), AMw>BMw, preferably 50000≧(AMw-BMw)>0, further preferably 50000≧(AMw-BMw)≧1000, more preferably 50000≧(AMw-BMw)≧5000, or in a peaktop molecular weight (AMp) of the copolymer (A) and a peaktop molecular weight (BMp) of the copolymer (B), AMp>BMp, preferably 5000≧(AMp-BMp)≧0, further preferably 5000≧(AMp-BMp)≧1000, more preferably 3000≧(AMw-BMw)≧1000. When the copolymer (A) and the copolymer (B) are outside this range, initial flowability and performance of retaining the flowability are inferior, being not preferable.

A mixing ratio of the copolymer (A) and the copolymer (B) is preferably (A)/(B)=0.1 to 10.0, further preferably (A)/(B)=0.3 to 2.5, more preferably (A)/(B)=0.6 to 1.5, expressed by mass ratio.

It is preferable that the copolymer (A) and/or the copolymer (B) contain a constitutional site (II) represented by the general formula (2). A constitutional site (II) constituting the copolymer (A) and a constitutional site (II) constituting the copolymer (B) may be the same or different, or a constitutional site (II) constituting each copolymer may be one kind or two or more kinds.

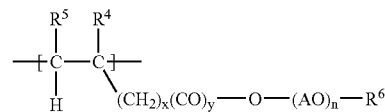

In the formula, $R^4$ and $R^5$ are the same or different, and represent a hydrogen atom or a methyl group, AO represents one kind of an oxyalkylene group of a carbon number of 2 to 4, or a mixture of two or more kinds and, in the case of two or more kinds, those groups may be added in a block manner, or in a random manner. And, x represents a number of 0 to 2, and y represents 0 or 1. And, n represents an average addition mole number of an oxyalkylene group, and is a number of 1 to 300. $R^6$ represents a hydrogen atom or a hydrocarbon group of a carbon number of 1 to 20, preferably n is a number of 2 to 120, further preferably a number of 6 to 120, more preferably a number of 8 to 50.

It is preferable that, as an oxyalkylene chain (AO) in a constitutional site (II), an oxyalkylene chain having a constitutional unit of an oxyalkylene group of a carbon number of 3 and/or 4 is contained as an essential component. When a polycarboxylic acid-based polymer for an admixture for cement of the present invention contains a constitutional site (II) having an oxyalkylene chain (AO) having a constitutional unit of an oxyalkylene group of a carbon number of 3 and/or 4, hydrophobicity of a polymer is increased, and state of a cement is modified. However, since when hydrophobicity becomes too strong, cement dispersibility (i.e. water reducing property) is deteriorated in some cases, a ratio of a mole number of a constitutional site (II) in which a carbon number of AO is 2, and a mole number of a constitutional site (II) in which a carbon number of AO is 3 and/or 4 is such that mole number of a constitutional site (II) in which a carbon number of AO is 2/mole number of a constitutional site (II) in which a carbon number of AO is 3 and/or 4 is preferably 99/1 to 50/50, more preferably 98/2 to 60/40, further preferably 97/3 to 70/30, most preferably 96/4 to 80/20.

A constitutional site (II) is contained at 2 to 98% by mass in the copolymer (A), and at 2 to 98% by mass in the copolymer (B), preferably at 50 to 90% by mass in the copolymer (A) and/or the copolymer (B), further preferably at 70 to 85% by mass. When an amount exceeds this range, then, in order to manifest flowability of a cement composition, a use amount is increased and, further, hardening delay is caused in some cases, being disadvantageously.

In order to introduce a constitutional site (I) into the copolymer (A) and the copolymer (B), it can be introduced by copolymerizing a monomer (I-M) represented by the general formula (3) and other monomer copolymerizable with the monomer (I-M). As other monomer, one kind or two or more kinds among a monomer (II-M) which is a precursor of a constitutional site (II) described later and a third monomer (III-M) can be used.

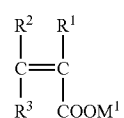

In the formula, $R^1$, $R^2$ and $R^3$ are the same or different, and represent a hydrogen atom, a methyl group or —$(CH_2)_Z$ COOM$^2$, and Z represents a number of 0 to 2. —$(CH_2)_Z$ COOM may form an anhydride with —COOM$^1$ or —$(CH_2)_Z$ COOM$^2$. M$^1$ and M$^2$ are the same or different and represent a hydrogen atom, an alkali metal atom, an alkaline earth metal atom, an ammonium group or an organic amine group.

Examples of the monomer (I-M) include unsaturated monocarboxylic acid-based monomers such as acrylic acid, methacrylic acid, and crotonic acid, and a metal salt, an ammonium salt, and an amine salt thereof; unsaturated dicarboxylic acid-based monomers such as maleic acid, itaconic acid, citraconic acid, and fumaric acid, and a metal salt, an ammonium salt, and an amine salt thereof. Further, an anhydride of these unsaturated dicarboxylic acids may be used, and one kind or two or more kinds of them may be used.

In order to introduce a constitutional site (II) into the copolymer (A) and the copolymer (B), it can be introduced by copolymerizing a monomer (II-M) represented by the general formula (4).

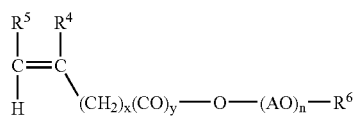

(4)

In the formula, $R^4$ and $R^5$ are the same or different, and represent a hydrogen atom or a methyl group. AO represents a mixture of one kind or two or more kinds of oxyalkylene groups of a carbon number of 2 to 4 and, in the case of two or more kinds, they may added in a block manner or in a random manner. And, x represents a number of 0 to 2, and y represents 0 or 1. And, n represents an average addition mole number of an oxyalkylene group, and is a number of 1 to 300. $R^6$ represents a hydrogen atom or a hydrocarbon group of a carbon number of 1 to 20, and n is a number of preferably 2 to 120, further preferably a number of 6 to 120, more preferably a number of 8 to 50.

Examples of the monomer (II-M) include a (half) ester of one terminal alkyl-blocked polyalkylene glycol such as methoxypolyethylene glycol, methoxypolypropylene glycol, and α-alkyl-ω-ol which is a block or random polymer of oxyethylene and oxypropylene, and (meth)acrylic acid or maleic acid and an ether with (meth)allyl alcohol, or 3-methyl-3-butene-1-ol; an adduct of alkylene oxide to unsaturated carboxylic acid such as (meth)acrylic acid and maleic acid, or unsaturated alcohol such as (meth)allyl alcohol, and 3-methyl-3-butene-1-ol. One kind or two or more kinds of them may be used, and an ester of α-methyl-ω-ol in which ethylene oxide and propylene oxide are block-added to methanol, and (meth)acrylic acid is preferable.

Examples of the third monomer (III-M) include monomers such as acrylamide, styrene, methylstyrene, vinyl acetate, indene, and (meth)acrylic acid alkyl ester.

It is preferable to obtain the copolymer (A) and the copolymer (B) by copolymerizing a monomer (I-M), a monomer (II-M) and a monomer (III-M). Letting a total amount to be 100% by mass, a ratio of these monomers to be used is (I-M)/(II-M)/(III-M)=2 to 90% by mass/O to 50% by mass/0 to 50% by mass, preferably (I-M)/(II-M)/(III-M) =2 to 90% by mass/2 to 98% by mass/0 to 50% by mass, further preferably (I-M)/(II-M)/(III-M)=10 to 50% by mass/ 50 to 90% by mass/0 to 50% by mass, more preferably (I-M)/(II-M)/(III-M)=15 to 30% by mass/70 to 85% by mass/0 to 50% by mass.

Letting a use ratio of a monomer (I-M) relative to a total monomer (100% by mass) used in synthesis of the copolymer (A) to be I-MA (% by mass) and a use ratio of a monomer (I-M) relative to a total monomer (100% by mass) used in synthesis of the copolymer (B) to be I-MB (% by mass), 12≧{(I-MA)−(I-MB)}>0, or 12≧{(I-MB)−(I-MA) }≧0, preferably 8≧{(I-MA)−(I-MB)}≧0, or 8≧{(I-MB)−(I-MA)}≧0, further preferably 4≧{(I-MA)−(I-MB)}≧0, or 4≧{(I-MB)−(I-MA)}≧0.

Letting an amount of a total monomer used in synthesis of the copolymer (A) to be 100 g, a mole number of a monomer (I-M) to be used among it to be I-MAL, an amount of a total monomer used in synthesis of the copolymer (B) to be 100 g, and a mole number of a monomer (I-M) to be used among it to be I-MBL, 0.11≧{(I-MAL)−(I-MBL)}≧0, or 0.11≧(I-MBL)−(I-MAL))≧0, preferably 0.07≧{(I-MAL)−(I-MBL) }≧0, or 0.07≧{(I-MBL)−(I-MAL)}>0, further preferably 0.04≧{(I-MAL)−(I-MBL)}≧0, or 0.04≧{(I-MBL)−(I-MAL)}≧0. When the amount is outside this range, then, in order to manifest flowability of a cement composition, a use amount is increased and, further, hardening delay is caused in some cases, being disadvantageous.

A monomer (I-M) used in the copolymer (A) and a monomer (I-M) used in the copolymer (A) may be the same or different, a monomer [1]-M) used in the copolymer (A) and a monomer (II-M) used in the copolymer (B) may be the same or different and a monomer (III-M) used in the copolymer (A) and a monomer (III-M) used in the copolymer (B) may be the same or different.

A method of mixing the copolymer (A) and the copolymer (B) is not particularly limited, but an aqueous solution of the copolymer (A) and the copolymer (B) may be mixed at 20° C. to 100° C. or other copolymer may be synthesized in the presence of any copolymer of the copolymer (A) and the copolymer (B).

Copolymerization of a monomer (I-M), a monomer (II-M) and a monomer (III-M) can be performed by a method such as polymerization in a solvent and bulk polymerization.

Solution polymerization can be performed by a batch manner or a continuous manner. A solvent used thereupon is not particularly limited, but examples include water; alcohol such as methyl alcohol, ethyl alcohol, and isopropyl alcohol; aromatic or aliphatic hydrocarbon such as benzene, toluene, xylene, cyclohexane, and n-hexane; ester compound such as ethyl acetate; ketone compound such as acetone, and methyl ethyl ketone; cyclic ether compound such as tetrahydrofuran, and dioxane.

When aqueous solution polymerization is performed, as a radical polymerization initiator, a water-soluble polymerization initiator, for example, persulfate salt such as ammonium persulfate, sodium persulfate, and potassium persulfate; hydrogen peroxide; water-soluble azo initiator such an azoamidine compound such as 2,2'-azobis-2-methylpropionamidine hydrochloride, cyclic azoamidine compound such as 2,2'-azobis-2-(2-imidazolin-2-yl)propane hydrochloride, and azonitrile compound such as 2-carbamoylazoisobutyronitrile is used. Thereupon, a promoter (reducing agent) such as alkali metal sulfite such as sodium hydrogen sulfite, metadisulfite, sodium hypophosphite, Fe(II) salt such as Mohr's salt, sodium hydroxylmethane sulfinate, hydroxylamine hydrochloride, thiourea, L-ascorbic acid (salt), and erysorbic acid (salt) may be used jointly. Inter alia, a combination of hydrogen peroxide and an organic reducing agent is preferable and, as the organic reducing agent, L-ascorbic acid (salt), L-ascorbic acid ester, erysorbic acid (salt), and erysorbic acid ester are suitable. These radical polymerization initiators and promoters (reducing agents) may be used alone or two or more kinds may be used jointly.

When solution polymerization is performed using, as a solvent, lower alcohol, aromatic, or aliphatic hydrocarbon ester compound or ketone compound, or when bulk polymerization is performed, peroxide such as benzoyl peroxide, lauroyl peroxide, and sodium peroxide; hydroperoxide such as t-butyl hydroperoxide, and cumene hydroperoxide; azo compound such as azobisisobutyronitrile are used as a radical polymerization initiator. Thereupon, a promoter such as an amine compound may be used jointly. Further, when a water-lower alcohol mixed solvent is used, it can be used by appropriately selecting among the aforementioned various radical polymerization initiators, or a combination of a radical polymerization initiator and a promoter.

A polymerization temperature is appropriately determined depending on a solvent used and a radical polymerization initiator, and is preferably 0 to 150° C., more preferably 30 to 120° C., further preferably 50 to 100° C.

A method of placing each monomer into a reaction vessel is not particularly limited, and any of a method of placing an all amount into a reaction vessel at once at an initial stage, a method of placing an all amount into a reaction vessel in a divided manner or continuously, and a method of placing a part into a reaction vessel at an initial stage, and a method of placing a remainder into a reaction vessel in a divided manner or continuously, may be used. Alternatively, by changing a ratio of a placed mass of each monomer per unit time continuously or stepwise by changing a rate of placing each monomer into a reaction vessel continuously or stepwise during a reaction, a mixture of the copolymer (A) and/or the copolymer (B) having a different ratio of a constitutional site in the copolymer (A) and/or the copolymer (B) may be synthesized during a polymerization reaction. A radical polymerization initiator may be placed into a reaction vessel at beginning, or may added dropwise to a reaction vessel, or these may be combined depending on the purpose.

In order to adjust a molecular weight of the resulting copolymer (A) and/or copolymer (B), a chain transfer agent can be used.

The chain transfer agent is not particularly limited, but the known hydrophilic chain transfer agent such as thiol-based chain transfer agent such as mercaptoethanol, thioglycerol, thioglycolic acid, 3-mercapopropionic acid, thiomalic acid, and 2-mercaptoethanesulfonic acid; secondary alcohol such as isopropyl alcohol; lower oxide and a salt thereof of phosphorous acid, hypophosphorous acid and a salt thereof (sodium hypophosphite, potassium hyposulfite etc.), sulfurous acid, hydrogen sulfite, dithionic acid, metabisulfurous acid and a salt thereof (sodium sulfite, sodium hydrogen sulfite, sodium dithionate, sodium metabisulfite etc.) can be used. Further, when a hydrophobic chain transfer agent is used, it is effective in improving a viscosity of a cement composition. It is preferable to use, as a hydrophobic chain transfer agent, a thiol-based chain transfer agent having a hydrocarbon group of a carbon atom number of 3 or more such as butanethiol, octanethiol, decanethiol, dodecanethiol, hexadecanethiol, octadecanethiol, cyclohexylmercaptan, thiophenol, octyl thioglycolate, and octyl 3-mercaptopropionate. It is preferable to use two or more kinds of chain transfer agents, or a combination of hydrophilic chain transfer agent and a hydrophobic chain transfer agent may be used. Further, in order to adjust a molecular weight, it is also effective to use a monomer having high chain transferring property such as (meth)allyl sulfonic acid (salt).

Since it is necessary to stably proceed a polymerization reaction in order to reproducibly obtain a copolymer having a predetermined molecular weight in the aforementioned polymerization, when solution polymerization is performed, a dissolved oxygen concentration in a solvent used at 25° C. is preferably in a range of 5 ppm or lower. A preferable range is 0.01 to 4 ppm, a further preferable range is 0.01 to 2 ppm, and a most preferable range is 0.01 to 1 ppm. When nitrogen replacement is performed after addition of a monomer to a solvent, a dissolved oxygen concentration in a system also containing a monomer is in the aforementioned range.

Adjustment of the dissolved oxygen concentration of a solvent may be performed in a polymerization reactor, or an amount of dissolved oxygen which has been adjusted in advance may be used. Examples of a method of expelling oxygen in a solvent include the following (1) to (5) methods.

(1) After an inert gas such as nitrogen is filled under pressure into a sealed vessel containing a solvent, a pressure in a sealed vessel is decreased, whereby, a partial pressure of oxygen in a solvent is reduced, A pressure in a sealed vessel may be reduced under a nitrogen stream.

(2) A liquid phase part is vigorously stirred for a long time while a vapor phase part in a vessel containing a solvent is replaced with an inert gas such as nitrogen.

(3) An inert gas such as nitrogen is bubbled into a solvent placed in a vessel for a long time.

(4) After a solvent is boiled once, cooling is performed under an inert gas atmosphere such as nitrogen.

(5) A stationery-type mixer (static mixer) is disposed midway in a piping, and an inert gas such as nitrogen is mixed in a piping for conveying a solvent to a polymerization reactor.

From a viewpoint of handling property, the copolymer (A) and the copolymer (B) obtained by the aforementioned copolymerization is adjusted in a pH range of weak acidity in the aqueous state, more preferably in a range of a pH 4 or higher, further preferably a range of a pH 5 or higher, particularly preferably a range of a pH6 or higher. On the other hand, a copolymerization reaction may be performed at a pH 7 or higher, but in that case, since a polymerization rate is reduced and, at the same time, copolymerizability is deteriorated, and dispersibility is reduced, a polymerization reaction is performed preferably in an acidic to neutral pH range, more preferably at a pH of lower than 6, further preferably at pH of lower than 5.5, particularly preferably at a pH of lower than 5. Therefore, it is preferable that after a copolymerization reaction is performed at a low pH, an alkaline substance is added to adjust a pH higher. As a preferable embodiment, specifically, examples include a method of adding an alkaline substance to adjust a pH to 6 or higher after a copolymerization reaction is performed at a pH of lower than 6, a method of adding an alkaline substance to adjust a pH to 5 or higher after a copolymerization reaction is performed at a pH of lower than 5, and a method of adding an alkaline substance to adjust a pH to 6 or higher after a copolymerization reaction is performed at a pH of lower than 5. Adjustment of a pH can be performed using an alkaline substance such as an inorganic salt such as hydroxide and carbonate of a monovalent metal or a divalent metal; ammonia; organic amine. In addition, when it is necessary to reduce a pH, in particular, when adjustment of a pH is necessary upon polymerization, a pH can be adjusted using an acidic substance such as phosphoric acid, sulfuric acid, nitric acid, alkyl phosphate, alkyl sulfate, alkyl sulfonate, and (alkyl)benzenesulfonate. Among these acidic substances, phosphoric acid is preferable in that it has pH buffering action. In addition, after completion of a reaction, a concentration may be adjusted if necessary.

[Polymer for Admixture for Cement (b)]

A polymer for an admixture for cement (b) which can be contained in the admixture for cement of the present invention as an essential component is a polycarboxylic acid-based polymer showing a specified GPC chart, and is a polycarboxylic acid-based polymer for the admixture for cement of the present invention.

The polycarboxylic acid-based polymer for the admixture for cement of the present invention is characterized in that a lower molecular weight side area ratio P defined by the following (1) to (6) is 50 to 87%. A GPC chart for explaining a lower molecular weight side area ratio P defined in the present invention will be shown in FIG. 1 (in the case of one peak), or FIG. 2 (in the case of two peaks).

(1) Measurement is performed by gel permeation chromatography (GPC), and a GPC chart is obtained.

(2) A baseline of a GPC chart is drawn, and an intersection point between a higher molecular weight side of a GPC chart and a baseline is expressed by Lh, and an intersection point between a lower molecular weight side of a GPC chart and a baseline is expressed by Ln.

(3) An intersection point between a line which passes through a peak Mp (when there are plural peaks, a peak on a lowest molecular weight side) of a GPC chart and is vertical to a baseline, and a baseline is expressed by Lp.

(4) A middle point of Lp and Lh is expressed by Lm.

(5) In a GPC chart, an area which is lower molecular weight side than Lp is expressed by P0, and an area which is higher molecular weight side than Lm is expressed by Q0.

(6) A lower molecular weight side area ratio P (%) is defined as P=(P0×100)/(P0+Q0).

The polycarboxylic acid-based polymer for the admixture for cement of the present invention is characterized in that a lower molecular weight side area ratio P is 50 to 87%, and a lower molecular weight side area ratio P is preferably 55 to 85%, more preferably 60 to 80%, further preferably 65 to 75%.

When a lower molecular weight side area ratio P is outside the aforementioned range, there is a possibility that the effect of the present invention is not sufficiently exerted when used as an admixture for cement, in particular, there is a possibility that slump retaining performance and workability performance are reduced.

Since the polycarboxylic acid-based polymer for the admixture for cement of the present invention has a lower molecular side area ratio P is 50 to 87%, a higher molecular weight side area ratio Q defined by the following (7) is 13 to 50%.

(7) A higher molecular weight side area ratio Q is defined as Q=(Q0×100)/(P0+Q0).

The polycarboxylic acid-based polymer for the admixture for cement of the present invention has a higher molecular weight side area ratio Q of 13 to 50%, and a higher molecular weight side area ratio Q is preferably 15 to 45%, more preferably 20 to 40%, further preferably 25 to 35%.

When a higher molecular weight side area ratio Q is outside the aforementioned range, there is a possibility that the effect of the present invention is not sufficiently exerted when used as an admixture for cement, in particular, there is possibility that dispersibility is reduced.

In the polycarboxylic acid-based polymer for the admixture for cement of the present invention, a ratio R (%) of (P0+Q0) occupied in a total area G (area of a part surrounded by a GPC chart curve and a baseline) in a GPC chart (R (%)=[(P0+Q0)×100]/G) is preferably $10 \leq R \leq 80$, more preferably $15 \leq R \leq 70$, further preferably $20 \leq R \leq 65$, particularly preferably $25 \leq R \leq 60$.

When a ratio R of (P0+Q0) is outside the aforementioned range, there is a possibility that the effect of the present invention is not sufficiently exerted when used as an admixture for cement.

In the polycarboxylic acid-based polymer for the admixture for cement of the present invention, a molecular weight distribution Mw/Mn is preferably 1.3 to 2.5, more preferably 1.5 to 2.2, further preferably 1.8 to 2.0.

When a molecular weight distribution Mw/Mn is outside the aforementioned range, there is a possibility of that the effect of the present invention is not sufficiently exerted when used as an admixture for cement.

The polycarboxylic acid-based polymer for the admixture for cement of the present invention has a weight average molecular weight Mw of preferably 10000 to 200000, more preferably 20000 to 100000, further preferably 25000 to 80000, particularly preferably 30000 to 70000.

When a weight average molecular weight Mw is outside the aforementioned range, there is a possibility that the effect of the present invention is not sufficiently exerted when used as an admixture for cement.

The polycarboxylic acid-based polymer for the admixture for cement of the present invention has a peaktop molecular weight Mp of preferably 10000 to 40000, more preferably 15000 to 35000, further preferably 20000 to 30000.

When a peaktop molecular weight Mp is outside the aforementioned range, there is a possibility that the effect of the present invention is not sufficiently exerted when used as an admixture for cement.

The polycarboxylic acid-based polymer for the admixture for cement of the present invention may consist of one kind of polymer, or consist of two or more kinds of polymers.

The polycarboxylic acid-based polymer for the admixture for cement of the present invention contains preferably 2 to 90% by mass, more preferably 10 to 50% by mass, further preferably 15 to 30% by mass of a constitutional site (I) represented by the general formula (1).

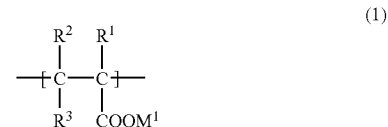

(wherein $R^1$, $R^2$ and $R^3$ are the same or different, and represent a hydrogen atom, a methyl group or $-(CH_2)_Z COOM^2$, Z represents a number of 0 to 2, wherein $-(CH_2)_Z COOM^2$ may form an anhydride with $-COOM^1$ or $-(CH_2)_Z COOM^2$, and $M^1$ and $M^2$ are the same or different and represent a hydrogen atom, an alkali metal atom, an alkaline earth metal atom, an ammonium salt or an organic amine group)

When a ratio of a constitutional site (I) contained in the polycarboxylic acid-based polymer for the admixture for cement of the present invention exceeds the aforementioned range, then, in order to manifest flowability of a cement composition, a use amount is increased, and hardening delay is caused in some cases, being disadvantageous.

The polycarboxylic acid-based polymer for the admixture for cement of the present invention contains preferably 2 to 98% by mass, more preferably 50 to 90% by mass, further preferably 70 to 85% by mass of a constitutional site (II) represented by the general formula (2).

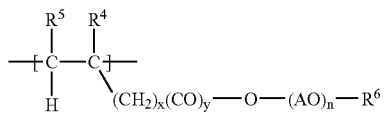

(wherein $R^4$ and $R^5$ are the same or different, and represent a hydrogen atom or a methyl group, AO represents a mixture of one kind or two or more kinds of oxyalkylene groups of a carbon number of 2 to 4 and, in the case of two or more kinds, they may be added in a block manner or in a random manner, x represents a number of 0 to 2, y represents or 1, n represents an average addition mole number of an oxyalkylene group, and is a number of 1 to 300, and $R^6$ represents a hydrogen atom or a hydrocarbon group of a carbon number of 1 to 20)

When a ratio of a constitutional site (II) contained in the polycarboxylic acid-based polymer for the admixture for cement of the present invention exceeds the aforementioned range, then, in order to manifest flowability of a cement composition, a use amount is increased and, further, hardening delay is caused in some cases, being disadvantageous.

When the polycarboxylic acid-based polymer of the present invention contains a constitutional site (II), it is preferable from a viewpoint of further sufficient manifestation of the effect of the present invention that the polymer contains, as an essential component, an oxyalkylene chain having an oxyalkylene group of a carbon number of 3 and/or 4 as a constitutional unit, as an oxyalkylene chain in a constitutional site (II). An average addition mole number n of such the oxyalkylene chain having an oxyalkylene group of a carbon number of 3 and/or 4 as a constitutional unit is preferably 1 to 300, more preferably 2 to 250, further preferably 4 to 200, particularly preferably 6 to 150, most preferably 8 to 100.

When the polycarboxylic acid-based polymer for the admixture for cement of the present invention contains a constitutional site (II), it is preferable that an oxyalkylene chain having an oxyalkylene group of a carbon number of 1 and/or 2 as a constitutional unit is bound to both ends of an oxyalkylene chain having an oxyalkylene group of a carbon number of 3 and/or 4 as a constitutional unit. An average addition mole number n of such the oxyalkylene chain having an oxyalkylene group of a carbon number of 1 and/or 2 as a constitutional unit is preferably 1 to 300, more preferably 2 to 250, further preferably 4 to 200, particularly preferably 6 to 150, most preferably 8 to 100.

In order to introduce a constitutional site (I) into the polycarboxylic acid-based polymer for the admixture for cement of the present invention, it is preferable to introduce the site by homopolymerization of a monomer (I-M) represented by the general formula (3), or copolymerization of a monomer (I-M) and other monomer copolymerizable with the monomer (I-M). The monomer (I-M) may be used alone, or two or more kinds of the monomers may be used jointly.

In order to introduce a constitutional site (II) into the polycarboxylic acid-based polymer for the admixture for cement of the present invention, it is preferable to use a monomer (II-M) represented by the general formula (4) as the aforementioned other monomer. The monomer (II-M) may be used alone, or two or more kinds may be used jointly.

As the aforementioned other monomer, a third monomer (III-M) may be used. The monomer (III-M) may be used alone, or two or more kinds may be used.

Letting a total amount of monomer components to be 100% by mass, a compositional ratio of a monomer component used in production of the polycarboxylic acid-based polymer for the admixture for cement of the present invention is preferably (I-M)/(II-M)/(III-M)=2 to 90% by mass/0 to 50% by mass/0 to 50% by mass, more preferably (I-M)/(II-M)/(III-M)=2 to 90% by mass/2 to 98% by mass/0 to 50% by mass, further preferably (I-M)/(II-M)/(III-M)=10 to 50% by mass/50 to 90% by mass/0 to 50% by mass, particularly preferably (I-M)/(II-M)/(III-M)=15 to 30% by mass/70 to 85% by mass/0 to 50% by mass.

Figure 2:
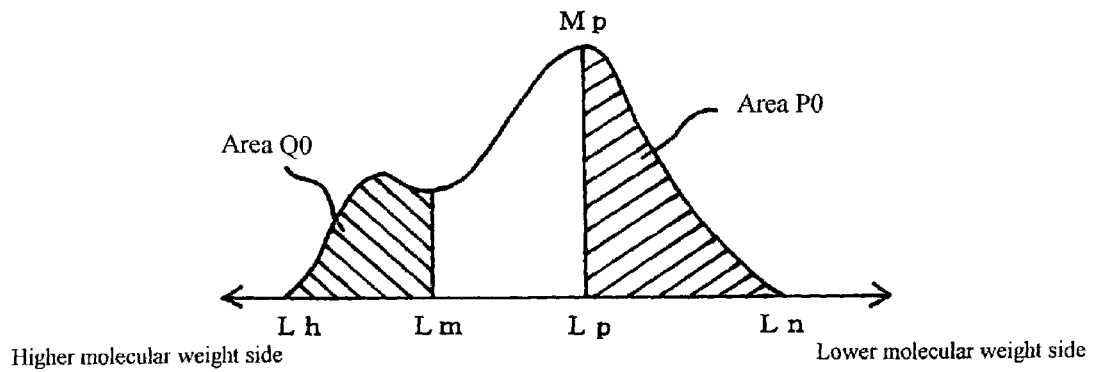
FIG. 2 is a GPC chart view (in the case of two peaks) for explaining a lower molecular weight side area ratio P defined in the present invention.

The polycarboxylic acid-based polymer for the admixture for cement of the present invention can be obtained, for example, by blending a copolymer (A) in the present invention having a higher molecular weight Mp than Mp of FIG. 1 and FIG. 2 and a copolymer (B) in the present invention having the same Mp as Mp of FIG. 1 and FIG. 2 at a ratio of (A)/(B)=1/9 to 5/5 (ratio by mass) (the copolymer (A) and the copolymer (B) referred herein may have the entirely same composition as described above), preferably, by the producing method of a polycarboxylic acid-based polymer for an admixture for cement of the present invention, that is, by the following two methods of (i) and (ii). Whether either method of the following (i) or (ii) is adopted may be selected depending on whether any of slump retaining performance or workability and water reducing property or flowability is stressed as performance of the intended admixture for cement.

(i) Case where Slump Retaining Performance or Workability is Stressed

When slump retaining performance or workability becomes important upon use of the admixture for cement of the present invention, since it is preferable that a sufficient amount of a polymer having a low molecular weight is contained, a process for producing a low-molecular polymer effectively is preferable. One example of such the process includes a producing method of the polycarboxylic acid-based polymer for the admixture for cement of the present invention by radical-polymerizing a monomer component containing a monomer (I-M) represented by the general formula (3) as an essential component, with the producing method being characterized by comprising the following steps of: supplying a part of the monomer component together with a chain transfer agent into a reaction system and, thereafter, supplying a remainder of the monomer component without a chain transfer agent into a reaction system (hereinafter, referred to as "first producing method of a polymer").

In the first producing method of a polymer, among all monomer components, a remainder of a monomer component which has been supplied into a reaction system together with a chain transfer agent is supplied into a reaction system without a chain transfer agent after the aforementioned supply. As used herein, "supplied into a reaction system without a chain transfer agent" means that upon supply of a remaining monomer component into a reaction system, a chain transfer agent is not newly supplied into a reaction system. Therefore, upon supply of a remaining monomer component into a reaction system, a chain transfer agent which has been already supplied into a reaction system may remain in a reaction system.

(ii) Case where Water Reducing Property or Flowability is Stressed

When water reducing property or flowability becomes important upon use of the admixture for cement of the present invention, since an extent or more of a high-molecular polymer is contained, a process for producing a high-molecular polymer effectively is preferable. One such the process includes a producing method of the polycarboxylic acid-based polymer for the admixture for cement of the present invention by radical-polymerizing a monomer component containing a monomer (I-M) represented by the general formula (3) as an essential component, with the producing method being characterized by comprising the following steps of: supplying a part of the monomer component together with an amount (TR-1) corresponding to 0 to 20% by mass of it of a chain transfer agent into a reaction system and, thereafter, supplying a remainder of the monomer component together with an amount (TR-2) corresponding to 1 to 50% by mass of it of a chain transfer agent into a reaction system (hereinafter, referred to as "second producing method of a polymer" in some cases).

In the second producing method of a polymer, an amount (TR-1) of a chain transfer agent used together with a part of the monomer component and an amount (TR-2) of a chain transfer agent used together with a remainder of the monomer component may be appropriately determined in the aforementioned range depending on a molecular weight of the desired polycarboxylic acid-based polymer for the admixture for cement of the present invention, and a kind and a purity of a chain transfer agent used and, inter alia, since (TR-1) is 0 to 10% by mass relative to a part of the monomer component, a higher-molecular polymer is produced, being preferable. Further, when (TR-1) is 1 to 10% by mass relative to a part of the monomer component, a gel is hardly produced, being more preferable. In order to produce a polymer having a sufficiently high molecular weight, it is most preferable that (TR-1) is 1 to 5% by mass relative to a part of the monomer component.

On the other hand, most important in the present invention is that a suitable level of slump retaining performance or workability is maintained even when water reducing property or flowability is stressed. For realizing it, in the second producing method of a polymer, it is preferable that a polymer produced at a stage at which a remainder of the monomer component is supplied (that is, stage at which (TR-2) of a chain transfer agent is used) has an extent of a lower molecular weight than that of a polymer produced at a stage at which a part of the monomer component is supplied (that is, stage at which (TR-1) of a chain transfer agent is used). That is, it is preferable that an amount (TR-2) of a chain transfer agent used together with a remainder of the monomer component is larger than an amount (TR-1) of a chain transfer agent used together with a part of the monomer component, and it is preferable that a mass ratio of (TR-1) and (TR-2) is (TR-2)/(TR-1)=1.5 to 20. Inter alia, in the case of a mass ratio of (TR-2)/(TR-1)=3 to 20, further excellent slump retaining performance is obtained, being more preferable. In the case of a mass ratio of (TR-2)/(TR-1)=5 to 20, workability is further improved, being further preferable. In the case of a mass ratio (TR-2)/(TR-1)=5 to 10, water reducing property or flowability becomes further better, being most preferable.

As a polymerization method and a polymerization condition for preparing the carboxylic acid-based polymer for the admixture for cement of the present invention, the previously known polymerization method and polymerization condition can be applied except that the aforementioned respective characteristics are included in the process of the present invention (the first producing method of a polymer and the second producing method of a polymer). As a polymerization method, solution polymerization is preferable, and aqueous solution polymerization is particularly preferable. Solution polymerization may be performed in a batch manner or in a continuous manner, and a solvent used thereupon is the same as that described above.

A radical polymerization initiator which can be used for preparing the polycarboxylic acid-based polymer for the admixture for cement of the present invention is the same as that described above. Alternatively, a promoter (reducing agent) may be used jointly as described above.

Upon production of the polycarboxylic acid-based polymer for the admixture for cement of the present invention, a radical polymerization initiator may be present in a reaction system in advance before addition of a monomer component, or the initiator may be added at once or successively (continuous addition or intermittent addition) together with addition of a monomer component. Preferable is an aspect in which a radical polymerization initiator is successively added during addition of at least a monomer component to a reaction system.

A polymerization temperature can be appropriately determined depending on a solvent or a radical polymerization initiator used, and is preferably 0 to 150° C., more preferably 30 to 120° C., further preferably 40 to 110° C., particularly preferably 50 to 100° C., most preferably 60 to 80° C.

Upon production of the polycarboxylic acid-based polymer for the admixture for cement of the present invention, a monomer component which is supplied into a reaction system at beginning of polymerization (that is, a monomer component which is supplied into a reaction system together with a total amount of a chain transfer agent in the first producing method of a polymer, a monomer component which is supplied into a reaction system together with the aforementioned amount (TR-1) of a chain transfer agent in the second producing method of a polymer) is a part of a total monomer component used in production of the polycarboxylic acid-based polymer for the admixture for cement of the present invention, and is preferably 20 to 80% by mass, more preferably 30 to 70% by mass, further preferably 40 to 60% by mass relative to a total monomer component amount.

When an amount of the monomer component which is supplied into a reaction system at beginning of polymerization is not less than 20% by mass and less than 50% by mass relative to a total monomer component amount in the present invention, in the first producing method of a polymer, since an amount of a low-molecular polymer to be produced becomes relatively small, the lower molecular weight side area ratio P is around 50 to 80% and, in the second producing method of a polymer, since an amount of a high-molecular polymer to be produced becomes relatively small, the lower molecular weight side area ratio P is around 60 to 87%. In addition, when an amount of the monomer component which is supplied into a reaction system at beginning of polymerization is more than 50% by mass and not more than 80% by mass relative to a total monomer component in the present invention, in the first producing method of a polymer, since an amount of a low-molecular polymer to be produced becomes relatively large, the lower molecular weight side area ratio P is around 60 to 87% and, in the second producing method of a polymer, since an amount of a high-molecular polymer to be produced becomes relatively large, the lower molecular weight side area ratio B is around 50 to 80%.

A step of supplying a part of a monomer component into a reaction system (in the step, a monomer component is supplied together with a total amount of a chain transfer agent in the first producing method of a polymer, or together with the aforementioned amount (TR-1) of a chain transfer agent in the second producing method of a polymer), and a step of supplying a remainder of a monomer component into a reaction system thereafter (in the step, a monomer component is supplied without a chain transfer agent in the first producing method of a polymer, or together with the aforementioned amount (TR-1) of a chain transfer agent in the second producing method of a polymer) are preferably a continuous step.

An aspect of supplying a part of a monomer component together with a chain transfer agent (a total amount in the first producing method of a polymer, the aforementioned (TR-1) amount in the second producing method of a polymer) into a reaction system is not particularly limited, but a part of a monomer component and a chain transfer agent may be added to a reaction system through separate addition apparatuses, or a mixture of a part of a monomer component and a chain transfer agent may be added to a reaction system. It is preferable that a solvent is present in advance in a reaction system before addition of a monomer component.

A chain transfer agent which can be used for preparing the polycarboxylic acid-based polymer for the admixture for cement of the present invention is the same as that described above.

An amount of a chain transfer agent which can be used for preparing the polycarboxylic acid-based polymer for the admixture for cement of the present invention (an amount referred herein is a total amount of a chain transfer agent used for preparing the polycarboxylic acid-based polymer for the admixture for cement of the present invention, and is a total amount of (TR-1) and (TR-2) in the second producing method of a polymer) is preferably 0.5 to 20 mol %, more preferably 2 to 18 mol %, further preferably 5 to 15 mol % relative to a total monomer component used.

When solution polymerization is performed upon production of the polycarboxylic acid-based polymer for the admixture for cement of the present invention, it is preferable that a dissolved oxygen concentration of a solvent used at 25° C. is 5 ppm or lower in order to stably proceed a polymerization reaction. The concentration is more preferably 0.01 to 4 ppm, further preferably 0.01 to 2 ppm, particularly preferably 0.01 to 1 ppm. When nitrogen replacement is performed after addition of a monomer component to a solvent, it is preferable that a dissolved oxygen concentration of a system containing a monomer component is in the aforementioned range.

Adjustment of the dissolved oxygen concentration of a solvent may be performed in a polymerization reaction bath, or a solvent whose dissolved oxygen amount has been adjusted in advance may be used. Examples of a method of expelling oxygen in a solvent include the same method as that described above.

From a viewpoint of handling property, the polycarboxylic acid-based polymer (a) or (b) for the admixture for cement of the present invention may be adjusted in a pH range of weak acidity or higher in the aqueous solution state, preferably at a pH 4 or higher, further preferably at a pH 5 or higher, particularly preferably at a pH 6 or higher. On the other hand, a polymerization reaction may be performed at a pH of 7 or higher and, in that case, since a polymerization rate is reduced and, at the same time, polymerizability is deteriorated and dispersing performance is reduced, a polymerization reaction is performed preferably in an acidic to neutral pH range, more preferably at a pH of lower than 6, further preferably at a pH of lower than 5.5, particularly preferably at a pH of lower than 5. Therefore, it is preferable to perform a polymerization reaction at a low pH and, thereafter, add an alkaline substance to adjust a pH higher and, as a preferable embodiment, specifically, examples include a method of performing a polymerization method at a pH of lower than 6 and, thereafter, adding an alkaline substance to adjust a pH to 6 or higher, a method of performing a polymerization reaction at a pH of lower than 5 and, thereafter, adding an alkaline substance to adjust a pH to 5 or higher, and a method of performing a polymerization reaction at a pH of lower than 5 and, thereafter, adding an alkaline substance to adjust a pH to 6 or higher. A substance which can be used in adjustment of a pH is as described above.

[Admixture for Cement]

The admixture for cement of the present invention contains the aforementioned polymer (a) or (b) for an admixture for cement as an essential component.

The admixture for cement of the present invention may contain a defoaming agent, and the defoaming agent may be added after production of a polymer (a) or (b) for an admixture for cement, or may be added before initiation of polymerization, or during polymerization.

A ratio of a defoaming agent in an admixture for cement to be added is preferably 0.0001 to 10% by mass relative to a total mass of a polymer for an admixture for cement.

Specific examples of the defoaming agent include polyoxyalkylenes such as (poly)oxyethylene (poly)oxypropylene adduct; polyoxyalkylene alkyl ethers such as diethylene glycol heptyl ether, polyoxyethylene oleyl ether, polyoxypropylene butyl ether, polyoxyethylene polyoxypropylene 2-ethyl hexyl ether, and an adduce of oxyethylene oxypropylene to a higher alcohol of a carbon atom number of 12 to 14; polyoxyalkylene (alkyl) aryl ethers such as polyoxypropylene phenyl ether, and polyoxyethylene nonyl phenyl ether; acetylene ethers in which alkylene oxide is addition-polymerized to an acetylene alcohol such as 2,4,7,9-tetramethyl-5-decyn-4,7-diol, 2,5-dimethyl-3-hexyn-2,5-diol, and 3-methyl-1-butyn-3-ol; (poly)oxyalkylene fatty acid esters such as diethylene glycol oleic acid ester, diethylene glycol lauric acid ester, and ethylene glycol distearic acid ester; polyoxyalkylene sorbitan fatty acid esters such as polyoxyethylene sorbitan monolauric acid ester, and polyoxyethylene sorbitan trioleic acid ester; polyoxyalkylene alkyl (aryl) ether sulfate ester salts such as sodium polyoxypropylene dodecyl methyl ether sulfate and sodium polyoxyethylene dodecyl phenyl ether sulfate; polyoxyalkylene alkyl phosphate esters such as polyoxyethylene stearyl phosphate ester; polyoxyalkylene alkylamines such as polyoxypropylene polyoxyethylene laurylamine (propylene oxide 1 to 20 mole addition, ethylene oxide 1 to 20 mole adduct), and hardened tallow amine with alkylene oxide added thereto (propylene oxide 1 to 20 mole addition, ethylene oxide 1 to 20 mole adduct etc.); polyoxyalkyleneamide. These defoaming agents may be used alone, or two or more kinds of them may be used.

The admixture for cement of the present invention may be used in a form of an aqueous solution, or may be used by neutralizing with hydroxide of a divalent metal such as calcium and magnesium after polymerization to obtain a polyvalent metal salt, and drying this, drying while carried in an inorganic powder such as silica fine powder, or drying and solidifying into a film on a support using a drum-type drying apparatus, a disk-type drying apparatus or a belt-type drying apparatus and, thereafter, grinding this to obtain a powder. Alternatively, by blending a ground dispersant of the present invention in a cement composition not containing water such as a cement powder and a dry mortar in advance, the admixture for cement may be used as a premix product used in plastering, floor finishing, or grouting, or may be blended at kneading of a cement composition.

When the admixture for cement of the present invention contains the aforementioned polymer (a) for an admixture for cement as an essential component, it is preferable that the admixture for cement contains a polycarboxylic acid-based polymer different from the polymer (a) for an admixture for cement. Also when the admixture for cement contains a polymer (b) for an admixture for cement, it is preferable that the admixture for cement contains a polycarboxylic acid-based polymer different from the polymer (b) for an admixture for cement. That is, when the admixture for cement of the present invention contains the aforementioned polymer (a) for an admixture for cement as an essential component, it is preferable that the admixture for cement contains a polycarboxylic acid-based polymer other than the aforementioned copolymer (A) and copolymer (B). When the admixture for cement of the present invention contains the aforementioned polymer (b) for an admixture for cement as an essential component, it is preferable that the admixture for cement contains a polycarboxylic acid-based polymer having a lower molecular weight side area ratio P outside a range of 50 to 87%.

When the admixture for cement of the present invention contains a polycarboxylic acid-based polymer different from the polymer (a) or (b) for an admixture for cement in addition to the polymer (a) or (b) for an admixture for cement, a ratio of it to be contained (mass ratio) is preferably polymer (a) or (b) for admixture for cement/polycarboxylic acid-based polymer different from a polymer (a) or (b) for an admixture for cement=90/10 to 10/90, more preferably 80/20 to 20/80, further preferably 70/30 to 30/70, particularly preferably 60/40 to 40/60.

It is preferable that the admixture for cement of the present invention contains a polyalkylenimine alkylene oxide adduct.

When the admixture for cement of the present invention also contains a polyalkylenimine alkylene oxide adduct in addition to a polymer (a) or (b) for an admixture for cement a ratio of it to be contained (mass ratio) is preferably polymer (a) or (b) for an admixture for cement/polyalkylenimine alkylene oxide adduct=90/10 to 10/90, more preferably 80/20 to 20/80, further preferably 70/30 to 30/70, particularly preferably 60/40 to 40/60.

When the admixture for cement of the present invention also contains a polycarboxylic acid-based polymer and a polyalkylenimine alkylene oxide adduct different from a polymer (a) or (b) for an admixture for cement in addition to a polymer (a) or (b) for an admixture for cement as a particularly preferable combination of a polymer for an admixture for cement, a ratio of them to be contained (mass ratio) is preferably polymer (a) or (b) for admixture for cement/polycarboxylic acid-based polymer different from a polymer (a) or (b) for an admixture for cement/polyalkylenimine alkylene oxide adduct=10 to 80/10 to 89/1 to 80, more preferably 15 to 70/20 to 84/1 to 65, further preferably 20 to 60/30 to 77/3 to 50, particularly preferably 20 to 50/40 to 75/5 to 40.

A total amount of the aforementioned polymer for an admixture for cement occupied in the admixture for cement of the present invention is preferably 50% by mass or more, more preferably 60% by mass or more, further preferably 70% by mass or more, most preferably 80% or more relative to a total admixture for cement. This is preferable in respect of water reducing property and retainability.

As the polyalkylenimine alkylene oxide adduct, a polyalkylenimine alkylene oxide adduct containing an oxyalkylene group of a carbon number of 3 or more as an essential component is preferable.

The polyalkylenimine alkylene oxide adduct containing an oxyalkylene group of a carbon number of 3 or more as an essential component may be any adduct as far as it is polyalkylenimine having an oxyalkylene group of a carbon number of 3 or more, the adduct may have, or dose not need a polymerizable unsaturated double bond. Alternatively, these may be used jointly.

As the polyalkylenimine alkylene oxide adduct containing an oxyalkylene group of a carbon number of 3 or more having a polymerizable unsaturated double bond as an essential component, among polyalkylenimine alkylene oxide adduct monomers described later, a polyalkylenimine alkylene oxide adduct containing an oxyalkylene group of a carbon number of 3 or more as an essential component is preferable.

As the polyalkylenimine alkylene oxide adduct not having a polymerizable unsaturated double bond, a compound obtained by adding alkylene oxide to a nitrogen atom of an amino group and an imino group possessed by polyalkylenimine is preferable, A nitrogen atom of an amino group or an imino group to which alkylene oxide is added has an active hydrogen atom.

At least one kind of the aforementioned oxyalkylene groups is an oxyalkylene group of a carbon number of 3 or more and, when two or more kinds of oxyalkylene groups are present in the same adduct, the oxyalkylene group may take any form of random addition, block addition, and alternate addition.

The aforementioned polyalkylenimine is obtained by polymerizing one kind or two or more kinds of alkylenimine of a carbon number of 2 to 8 such as ethylenimine, propylenimine, 1,2-butylenimine, 2,3-butylenimine, and 1,1-dimethylethylenimine by a conventional method. A homopolymer or a copolymer of these alkylenimines is preferable. These may be used alone, or two or more kinds of them may be used jointly. By such the polyalkylenimine, a polyalkylenimine chain of a polyalkylenimine alkylene oxide adduct containing an oxyalkylene group of a carbon number of 3 or more as an essential component is formed, and the polyalkylenimine chain may be any of a straight structure, a branched structure and a three-dimensionally crosslinked structure. Further, the polyalkylenimine chain may be of ethylenediamine, diethylenetriamine, triethylenetetramine, or tetraethylenepentamine. Such the polyalkylenimine usually has a primary amino group or a secondary amino group (imino group) having an active hydrogen atom in addition to a tertiary amino group in a structure.

Alkylene oxide to be added to the polyalkylenimine may be alkylene oxide in which at least one kind of an oxyalkylene group of at least carbon number of 3 or more is added, and is a structure formed of, in addition to alkylene oxide of a carbon number of 2 to 8 such as ethylene oxide, propylene oxide, butylene oxide, isobutylene oxide, 1-butene oxide, 2-butene oxide, trimethylethylene oxide, tetramethylene oxide, tetramethylethylene oxide, butadiene monoxide, and octylene oxide, aliphatic epoxide such as dipentane ethylene oxide, and dihexane ethylene oxide; alicyclic epoxide such as trimethylene oxide, tetramethylene oxide, tetrahydrofuran, tetrahydropyran, and octylene oxide; aromatic epoxide such as styrene oxide, and 1,1-diphenylethylene oxide.

These may be used alone, or two or more kinds of them may be used jointly. In addition, an adduct consisting of ethylene oxide and propylene oxide, and an adduct consisting of ethylene oxide and butylene oxide have a better balance of water reducing property, slump retainability, strength improving effect, and air amount reducing effect of a cement composition when formulated into an admixture for cement, and are a preferable combination.

The aforementioned polyalkylenimine alkylene oxide adduct containing an oxyalkylene group of a carbon number of 3 or more as an essential component has a polyalkylenimine chain, and it is preferable that such the polyalkylenimine chain is formed mainly of ethylenimine. In this case, "mainly" means that, when a polyalkylenimine chain is formed of two or more kinds of alkylenimines, ethylenimine occupies a majority of a mole number of total alkylenimine. In the present invention, since ethylene occupies a majority of alkylenimine forming a polyalkylenimine chain, hydrophilicity of an adduct is improved, and action and effect are sufficiently exerted and, therefore, by using ethylenimine as alkylenimine forming a polyalkylenimine chain, the "occupies a majority" is realized, and the "mainly" can be realized.

When the "occupies a majority" in the aforementioned alkylenimine forming a polyalkylenimine chain is expressed by mol % of ethylenimine in total alkylenimine 100 mol %, 50 to 100 mol % is preferable. When a content is less than 50 mol %, there is a possibility that hydrophilicity of a polyalkylenimine chain is reduced. More preferable is 60 mol % or more, further preferable is 70 mol % or more, particularly preferable is 80 mol % or more, and most preferable is 90 mol % or more.

In the aforementioned polyalkylenimine alkylene oxide adduct containing an oxyalkylene group of a carbon number of 3 or more as an essential component, an average polymerization number of alkylenimine per one polyalkylenimine chain is preferably 2 or more, and preferably 300 or less. When the number is less than 2, there is a possibility that function of an adduct is not sufficiently exerted. When the number exceeds 300, there is a possibility that polymerizability of an adduct is reduced. Particularly preferable is 3 or more. In addition, more preferable is 200 or less, further preferably 100 or less, particularly preferable is 75 or less, and most preferable is 50 or less. In this case, an average polymerization number of diethylenetriamine is 2, and an average polymerization number of triethylenetetramine is 3.

In the aforementioned polyalkylenimine alkylene oxide adduct containing an oxyalkylene group of a carbon number of 3 or more as an essential component, further, it is preferable that an average addition mole number of an oxyalkylene group exceeds 0 and not more than 300. When the number exceeds 300, there is a possibility that polymerizability of these monomers is reduced. More preferable is 0.5 or more, further preferable is 1 or more, particularly preferable is 3 or more, and most preferable is 5 or more. In addition, more preferable is 270 or less, further preferable is 250 or less, particularly preferable is 220 or less, and most preferable is 200 or less. When an average addition mole number of an oxyalkylene group in an adduct is outside such the range, there is a possibility that effect of making flowability of a cement composition excellent is not sufficiently exerted. The average addition mole number means an average value of a mole number of an oxyalkylene group which is added in 1 mole of a group formed by an oxyalkylene group possessed by an adduct, or an average value of a mole number of an oxyalkylene group which is added per 1 mole of a nitrogen atom having an active hydrogen atom possessed by polyalkylenimine which forms an adduct.

A weight average molecular weight of a polyalkylenimine alkylene oxide adduct containing an oxyalkylene group of a carbon number of 3 or more as an essential component is preferably 300 or more, and preferably 100000 or less. More preferable is 400 or more, further preferable is 500 or more, further preferable is 600 or more, and particularly preferable is 1000 or more. In addition, more preferable is 50000 or less, further preferable is 30000 or less.

[Cement Composition]

The admixture for cement of the present invention can be used in various hydraulic materials, that is, a cement composition such as a cement and a gypsum, and other hydraulic materials. Examples of a hydraulic composition containing such the hydraulic material, water and the admixture for cement of the present invention and, further, if necessary, containing a fine aggregate (sand etc.) and a coarse aggregate (rubble etc.) include a cement paste, a mortar, a concrete, and a plaster.

Among the aforementioned hydraulic compositions, a cement composition using a cement as a hydraulic material is most general, and the cement composition contains the admixture for cement of the present invention, a cement and water as an essential component. Such the cement composition is one of preferable embodiments of the present invention.

That is, the cement composition of the present invention contains the admixture for cement of the present invention, a cement and water as an essential component.

A cement used in the cement composition is not particularly limited. Examples include a portland cement (normal, high early strength, super high early strength, moderate heat, sulfate-resisting, and low alkali form of each of them), various mixed cements (blast furnace cement, silica cement, fly ash cement), white portland cement, alumina cement, ultra rapid hardening cement (1 clinker rapid hardening cement, 2 clinker rapid hardening cement, magnesium sulfate cement), grouting cement, oil well cement, low heat cement (low heat type blast furnace cement, fly ash mixed low heat type blast furnace cement, belite highly-containing cement), super high strength cement, cement-based solidifying material, ecocement (cement prepared using, as a raw material, one or more kinds of municipal garbage incineration ash, and sewage sludge incineration ash). Further, fine powder such as blast furnace slug, fly ash, cinder ash, clinker ash, husk ash, silica fume, silica powder, and limestone, and a gypsum may be added. As an aggregate, silica stone, clay, gricon, high alumina, silicon carbide, graphite, chromium, chromium magnesium, and magnesia refractory aggregate in addition to gravel, crashed stone, granulated slag, and regenerated aggregate can be used.

In the cement composition, as a unit water amount and an amount of a cement to be used per 1 $m^3$, and a water/cement ratio (mass ratio), a unit water amount of 100 to 185 $kg/m^3$, an amount of a cement used of 200 to 800 $kg/m^3$, and a water/cement ratio (mass ratio)=0.1 to 0.7 is preferable and, more preferably, a unit water amount of 120 to 175 $kg/m^3$, an amount of a cement to be used of 250 to 800 $kg/m^3$, and a water/cement ration (mass ratio)=0.2 to 0.65 is recommended. Wide use from poor incorporation to rich incorporation is possible. The admixture for cement of the present invention can be also used at a high water reducing region, that is, a region of a low water/cement ratio such as a water/cement ratio (mass ratio)=0-15 to 0.5 (preferably 0.15 to 0.4) and, further, is effective in both of a high strength concrete having a large unit cement amount and a small water/cement ratio, and a poor incorporation concrete in which a unit cement amount is 300 kg/m³ or less.

A ratio of the admixture for cement of the present invention to be incorporated in the cement composition of the present invention is, for example, when used in a mortar or a concrete using a hydraulic cement, preferably 0.01 to 10.0% by mass of a cement mass in terms of a solid matter. By such the addition amount, various preferable effects such as reduction in a unit water amount, increase in a strength, and improvement in durability are exerted. When the incorporation ratio is less than 0.01% by mass, there is a possibility that sufficient performance is not obtained. Conversely, even when a large amount exceeding 10.0% by mass is used, the effect is substantially saturated, and there is a possibility that it is disadvantageous from a viewpoint of economy. A preferable range of an incorporation ratio is more preferably 0.02 to 5.0% by mass, further preferably 0.05 to 3.0% by mass, particularly preferably 0.1 to 2.0% by mass.

Since the cement composition of the present invention has high dispersibility and dispersion retaining performance also in a high water reducing rate region, exerts sufficient initial dispersibility and viscosity reducing property also at a low temperature, and has excellent workability, the composition is effective in a ready mixed concrete, a concrete for a concrete secondary product (precast concrete), a concrete for centrifugation molding, a concrete for vibration compaction, steam curing concrete, and shotcrete and further, is also effective in a mortar and a concrete requiring high flowability such as an intermediate flowing concrete (concrete having a slump value in a range of 22 to 25 cm), a high flowing concrete (concrete having a slump value of 25 cm or more, and a slump flow value in a range of 50 to 70 cm), a self-filling concrete, and a self-leveling material.

The admixture for cement of the present invention can be used together with the known admixture for cement, and may be used together with a plurality of the known admixture for cements. As the known admixture for cement which can be used jointly, a sulfonic acid-based dispersant (S) having a sulfonic acid group in a molecule is preferable. By using a sulfonic acid-based dispersant (S) having a sulfonic acid group in a molecule, an admixture for cement exerting stable dispersing performance is obtained not depending on a brand and a lot No. of a cement.

The sulfonic acid-based dispersant (S) is a dispersant manifesting dispersibility in a cement by electrostatic repulsion caused mainly by a sulfonic acid group, the known various sulfonic acid-based dispersants can be used, and a compound having an aromatic group in a molecule is preferable. Specifically, examples include various sulfonic acid-based dispersants such as a polyalkylarylsulfonate series such as a naphthalenesulfonic acid formaldehyde condensate, a methylnaphthalenesulfonic acid formaldehyde condensate, and an anthracenesulfonic acid formaldehyde condensate; a melamine formalin resin sulfonate series such as a melaminesulfonic acid formaldehyde condensate; an aromatic aminosulfonate series such as an aminoarylsulfonic acid-phenol-formaldehyde condensate; ligninsulfonate series such as ligninsulfonate, and modified ligninsulfonate; polystyrenesulfonate series. In the case of a concrete having a high water/cement ratio, a ligninsulfonate-based dispersant is preferably used. On the other hand, in the case of a concrete having an intermediate water/cement ratio requiring higher dispersing performance, dispersants such as a polyalkylarylsulfonate series, a melamine formalin resin sulfonate series, an aromatic aminosulfonate series, and a polystyrenesulfonate series are preferably used. Two or more kinds of sulfonic acid-based dispersants (S) having a sulfonic acid group in a molecule may be used jointly.

In the admixture for cement of the present invention, an oxycarboxylic acid-based compound (D) can be used jointly in addition to the sulfonic acid-based dispersant (S). By inclusion of the oxycarboxylic acid-based compound (D), higher dispersion retaining performance can be exerted also under high temperature environment.

As the oxycarboxylic acid-based compound (D) used in the present invention, oxycarboxylic acid of a carbon atom number of 4 to 10 or a salt thereof is preferable, and examples include inorganic salts and organic salts such as glucuronic acid, glucoheptonic acid, arabonic acid, malic acid and citric acid, and a sodium salt, a potassium salt, a calcium salt, a magnesium salt, an ammonium salt, and a trisethanolamine salt. Inter alia, it is preferable to use glucuronic acid or a salt thereof. These may be used alone, or two or more kinds of them may be used jointly. In particular, in the case of a poor incorporation concrete, it is preferable to use a ligninsulfonate-based dispersant as a sulfonic acid-based dispersant (S) having a sulfonic acid group in a molecule, and use glucuronic acid or a salt thereof as an oxycarboxylic acid-based compound (D).

The cement composition of the present invention can contain other known cement additives (materials) exemplified in the following (1) to (11).

(1) Water-soluble polymer substance: unsaturated carboxylic acid polymer of a sodium salt of (sodium) polyacrylate, (sodium) polymethacrylate, (sodium) polymaleate, acrylic acid-maleic acid copolymer; nonionic cellulose ethers such as methyl cellulose, ethyl cellulose, hydroxycellulose, hydroxyethyl cellulose, carboxymethyl cellulose, carboxyethyl cellulose, and hydroxypropyl cellulose; polysaccharide derivative in which a hydrogen atom of a part or all of a hydroxy group of an alkylated or hydroxyalkylated derivative of a polysaccharide is substituted with a hydrophobic substituent having a hydrocarbon chain of a carbon atom number of 8 to 40 as a partial structure, and an ionic hydrophilic substituent having a sulfonic acid group or a salt thereof as a partial structure, such as methyl cellulose, ethyl cellulose, hydroxyethyl cellulose, and hydroxypropyl cellulose; a polysaccharide produced by microorganism fermentation such as yeast glucan, xanthan gum, β-1.3 glucans (any of straight or branched may be used, and examples include cardrun, paramyron, pakiman, scleroglucan, laminaran etc.); polyacrylamide; polyvinyl alcohol; starch; starch phosphate ether; sodium alginate; gelatin; copolymer of acrylic acid having an amino group in a molecule and a quaternary compound thereof (2) Polymer emulsion: copolymer of various vinyl monomers such as alkyl (meth)acrylate (3) Hardening retarder other than oxycarboxylic acid-based compound (D); monosaccharides, such as glucose, fructose, galactose, saccharose, xylose, apiose, ribose and isomerized sugar, oligosaccharides such as disaccharides and trisaccharides, or oligosaccharides such as dextrin, or polysaccharides such as dextran, or sugars containing them such as molasses; sugar alcohol such as sorbitol; magnesium fluoride silicate; phosphoric acid and a salt thereof or boric acid ether; aminocarboxylic acid and a salt thereof; alkali-soluble protein; humic acid; tannic acid; phenol; polyhydric alcohol such as glycerin; phosphonic acid and a derivative thereof such as aminotri(methylenephosphonic acid), 1-hydroxyethylidene-1,1-diphosphonic acid, ethylenediaminetetra(methylenephosphonic acid), diethylenetriaminepenta (methylenephosphonic acid) and an alkali metal salt and an alkaline earth metal salt thereof (4) High early strengthening agent-promoter: soluble calcium salt such as calcium nitrite, calcium nitrate, calcium bromide, and calcium iodide; chloride such as iron chloride and magnesium chloride; sulfate; potassium hydroxide; sodium hydroxide; carbonate; thiosulfate; formic acid and formate such as calcium formate; alkanolamine; alumina cement; potassium aluminate silicate (5) Defoaming agent other than oxyalkylene series: mineral oil-based defoaming agent such as kerosine and liquid paraffin; fat or oil-based defoaming agent such as animal or vegetable oil, sesame oil, castor oil, and alkylene oxide adduct thereof; fatty acid ester-based defoaming agent such as oleic acid, stearic acid, and an alkylene oxide adduct thereof, fatty acid ester-based defoaming agent such as glycerin monoricinolate, alkenylsuccinic acid derivative, sorbitol monolaurate, sorbitol trioleate, and natural wax; alcohol-based defoaming agent such as octyl alcohol hexadecyl alcohol, acetylene alcohol, and glycols; amide-based defoaming agent such as acrylate polyamine; phosphate ester-based defoaming agent such as tributyl phosphate, and sodium octyl phosphate; metal soap-based defoaming agent such as aluminum stearate, and calcium oleate; silicone-based defoaming agent such as dimethylsilicone oil, silicone paste, silicone emulsion, organic modified polysiloxane (polyorganosiloxane such as dimethylpolysiloxane etc.), and fluorosilicone oil (6) AE agent: resin soap, saturated or unsaturated fatty acid, sodium hydroxystearate, lauryl sulfate, ABS (alkylbenzenesulfonic acid), LAS (straight alkylbenzenesulfonic acid), alkane sulfonate, polyoxyethylene alkyl (phenyl) ether, polyoxyethylene alkyl (phenyl)ether sulfate ester or a salt thereof, polyoxyethylene alkyl (phenyl)ether phosphate ester or a salt thereof, protein material, alkenylsulfosuccinic acid, α-olefin sulfonate (7) Other surfactant; polyalkylene oxide derivatives in which 10 mmole or more of alkylene oxide such as ethylene oxide and propylene oxide is added to an aliphatic monohydric alcohol having 6 to 30 carbon atoms in a molecule such as octadecyl alcohol and stearyl alcohol, alicyclic monohydric alcohol having 6 to 30 carbon atoms in a molecule such as abietyl alcohol, monovalent mercaptan having 6 to 30 carbon atoms in a molecule such as dodecyl mercaptan, alkylphenol having 6 to 30 carbon atoms in a molecule such as nonylphenol, amine having 6 to 30 carbon atoms in a molecule such as dodecylamine, or carboxylic acid having 6 to 30 carbon atoms in a molecule such as lauric acid and stearic acid; alkyl diphenyl ether sulfonates in which two phenyl groups having a sulfonic acid group, which may have an alkyl group or an alkoxy group as a substituent are bound to ether; various anionic surfactants; various cationic surfactants such as alkylamine acetate, and alkyltimethylammonium chloride; various nonionic surfactants; various amphoteric surfactants (8) Waterproofing agent: fatty acid (salt), fatty acid ester, fat or oil, silicone, paraffin, asphalt, and wax (9) Rust preventive: nitrite, phosphate, and zinc oxide

(10) Crack reducing agent: polyoxyalkyl ether

(11) Expanding admixture; ettringite series, coal series.

Examples of other known cement additives (materials) include a cement wetting agent, a thickener, a separation reducing agent, a flocculant, a drying shrinkage reducing agent, a strength enhancer, a self-leveling agent, a rust preventive, a coloring agent, and an anti-mold agent. These known cement additives (materials) may be used alone, or two or more kinds may be used jointly.

In the cement composition of the present invention, examples of a particularly preferable embodiment of the cement and components other than water include the following (1) to (4)

(1) A combination of two components of the admixture for cement of the present invention and an oxyalkylene-based defoaming agent as an essential component. As the oxyalkylene-based defoaming agent, polyoxyalkylenes, polyoxyalkylene alkylenes, polyoxyalkylene acetylene ethers, and polyoxyalkylene alkylamines can be used, and polyoxyalkylene alkylamines are particularly preferable. An incorporation mass ratio of an oxyalkylene-based defoaming agent is preferably in a range of 0.01 to 20% by mass relative to the admixture for cement of the present invention.

(2) A combination of two components of the admixture for cement of the present invention and a material separation reducing agent as an essential component. As the material separation reducing agent, various thickeners such as nonionic cellulose ethers, and compounds having a hydrophobic substituent consisting of a hydrocarbon chain of a carbon atom number of 4 to 30 as a partial structure, and a polyoxyalkylene chain with an average addition mole number of 2 to 300 of alkylene oxide of a carbon atom number of 2 to 18 added thereto can be used. An incorporation mass ratio of the admixture for cement of the present invention and a material separating reducing agent is preferably 10/90 to 99.99/0.01, more preferably 50/50 to 99.9/0.1. The cement composition of this combination is preferable as a highly flowing concrete, a self-filling concrete or a self-leveling material.

(3) A combination of two components of the admixture for cement of the present invention and a promoter as an essential component. As the promoter, soluble calcium salts such as calcium chloride, calcium nitrite, and calcium nitrate, chlorides such as iron chloride and magnesium chloride, thiosulfates, and formic acid and formate salts such as calcium formate can be used. As an incorporation mass ratio of the admixture for cement of the present invention and the promoter, 10/90 to 99.9/0.1 is preferable, and 20/80 to 99/1 is more preferable.

(4) A combination of three components of the admixture for cement of the present invention, an oxyalkylene-based defoaming agent, and an AE agent as an essential component. As the oxyalkylene-based defoaming agent, polyoxyalkylenes, polyoxyalkylene alkyl ethers, polyoxyalkylene acetylene ethers, and polyoxyalkylene alkyl amines can be used, and polyoxyalkylene alkylamines are particularly preferable. An incorporation mass ratio of the admixture for cement of the present invention and an defoaming agent is preferably 0.01 to 20% by mass relative to the admixture for cement of the present invention. On the other hand, an incorporation mass ratio of the AE agent is preferably 0.001 to 2% by mass relative to a cement.

EFFECTS AND ADVANTAGES OF THE INVENTION

According to the present invention, there can be provided an admixture for cement which enhances water reducing property and flowability of a cement composition, is excellent in slump retaining performance capable of retaining the flowability with time, and is excellent in workability, a polycarboxylic acid-based polymer for an admixture for cement which is suitable therefor, and a producing method thereof, and a cement composition.

DETAILED DESCRIPTION OF THE PREFERRED EMBODIMENTS

The present invention will be specifically explained below in more detail by way of Examples and Comparative Examples, but the present invention is not limited by them. Hereinafter, for convenience, "%" represents % by mass, and "part" represents part by mass in some cases.

A weight average molecular weight, a peaktop molecular weight, a lower molecular weight side area ratio P and a higher molecular weight side area ratio Q were obtained by GPC.

<GPC Measuring Conditions: Measurement Regarding Copolymers (A-1), (B-1) and (A-2)>

Model: Millenium system manufactured by Waters

Detector: 410RI detector manufactured by Waters

Column used: manufactured by TOSOH
  TSK-GEL G4000SWXL
  TSK-GEL G3000SWXL
  TSK-GEL G2000SWXL Each one column was used.

Eluent: Acetic acid was added to a mixture of 1765 g of acetonitrile, 3235 g of ion-exchanged water, and 34 g of sodium acetate trihydrate to adjust a pH to 6.0.

Flow rate: 1.0 ml/min

Injected amount: 100 µl of an eluent solution having a polymer concentration of 0.5%

Column temperature: 40° C.

Standard sample: polyethylene glycol

Molecular weights; 170,000, 85,000, 46,000, 26,000, 12,000 and 7,100 were used.

<GPC Measuring Conditions: Measurement Regarding Copolymers (C-1) to (C-4)>

Model: Empower System manufactured by Waters

Detector: 2414 Differential refraction detector by Waters

Column used: manufactured by TOSOH
  TSK guardcolumn α
  TSK-GEL α5000
  TSK-GEL α4000
  TSK-GEL α3000

Each one column was used.

Eluent: 8938.4 g of water, 27.9 g of boric acid and 33.8 g of potassium chloride were dissolved, a pH was adjusted to 9.0 with 30% NaOH, and 1000 g of acetonitrile were added to prepare an eluent.

Flow rate: 0.8 ml/min

Injected amount: 100 µl

Column temperature: 40° C.

Standard sample: polyethylene glycol
  Mp: 860,000, 570,000, 272, 500, 219, 300, 107,000, 50,000, 24,000, 12,600, 7100, 4250, 1470, 600 and 150 were used.

Calibration curve standard material: polyethylene glycol
  Mp: 860,000, 570,000, 272, 500, 219, 300, 107,000, 50,000, 24,000, 12,600, 7100, 4250, 1470, 600 and 150 were used.

Calibration curve order: This was produced using Mp of the polyethylene glycol by a cubic expression.

Analysis software: Empower software manufactured by Waters

<Method of Mortar Test>

Using 600 g of a normal portland cement (manufactured by Taiheiyo Cement Corporation), 1350 g of an ISO standard sand, 200 g of tap water and the admixture for cement of the present invention, a mortar was prepared, and its flow value was measured. An amount of the admixture for cement to be used is expressed by an addition amount as a solid matter, and a percentage relative to a cement amount is shown in Table 2. A producing method of a mortar and a method of measuring a flow value were performed according to a method of kneading in a strength test, and a flow test shown in JIS R5201. After first measurement of a flow value, a mortar was sealed in a plastic container, stored therein and, after each time passed, the mortar was mixed with a kneading spoon ten times, and a flow value was measured again.

<Concrete Test>

Test condition 1: water/cement ratio=175 kg/583 kg=0.3 (this is abbreviated as W/C30)

Cement: An equivalent amount of three kinds of Sumitomo Osaka Cement, Taiheiyo Cement and Ube Mitsubishi Cement were mixed.

Fine aggregate: mountain sand produced in Chiba-prefecture

Coarse aggregate: lime crushed stone produced in Aomori-prefecture, Hachinohe

Unit amount: s/a=42.3, air 451/m$^3$, water 175 kg/m$^3$, cement 583 kg/m$^3$, coarse aggregate 923.5 kg/m$^3$, fine aggregate 668.0 kg/m$^3$ Kneading method: Employing a forced kneading pan-type mixer (55 liter: manufactured by Pacific Machinery & Engineering Co., Ltd.), 30 litter was kneaded. A kneading method was performed in divided kneading, A fine aggregate and a cement were kneaded without water for 10 seconds, thereafter, a predetermined amount of water containing an admixture for cement was added, and the materials were kneaded for 60 seconds. Further, a coarse aggregate was added, and the materials were kneaded for 60 seconds and discharged to produce a concrete.

Test condition 2: water/cement ratio=175 kg/389 kg=0.45 (this is abbreviated as W/C45)

Cement: an equivalent amount of three kinds of Sumitomo Osaka Cement, Taiheiyo Cement and Ube Mitsubishi Cement were mixed.

Fine aggregate: mountain sand produced in Kimizu

Coarse aggregate: lime crushed stone produced in Aomori-prefecture, Hachinohe

Unit amount: water 175 kg/m$^3$, cement 389 kg/m$^3$, coarse aggregate 941 kg/m$^3$, fine aggregate 791 kg/m$^3$ Kneading method: A cement, a fine aggregate and a coarse aggregate were placed into a forced kneading pan-type mixer (55 liter; manufactured by Pacific Machinery & Engineering Co., Ltd.), the materials were kneaded without water for 10 seconds, then, water containing a predetermined amount of an admixture for cement was added and, further, the materials were kneaded for 120 seconds and discharged to produce a concrete.

PRODUCTION EXAMPLE 1

Production of H—(OC$_2$H$_4$)$_{13}$—(OC$_3$H$_6$)$_2$—(OC$_2$H$_4$)$_{10}$—OCH$_3$ A reaction apparatus equipped with a thermometer, a stirrer, a raw material introducing tube and a nitrogen introducing tube was charged with 1100 parts by mass of poly(n=10)ethylene glycol monomethyl ether and 0.5 part by mass of potassium hydroxide, the interior of a reactor was replaced with nitrogen, a temperature was raised to 120° C., and 235 parts by mass of propylene oxide was placed therein over 3 hours while maintaining at this temperature. After propylene oxide was placed, this was further aged at 120° C. for 2 hours, the interior of the reactor was replaced with nitrogen again, and 1165 parts by mass of ethylene oxide was placed therein over 3 hours while maintaining at 120° C. After ethylene oxide was placed, this was aged at 120° C. for 1 hour to obtain alkylene glycol monomethyl ether (ether alcohol 1) having a hydroxyl group value of 48 mg·KOH/g.

PRODUCTION EXAMPLE 2

Production of Ester 1

A reactor equipped with a thermometer, a stirrer, a nitrogen introducing tube and a condensation water separating tube was charged with 2203 parts by mass of alkylene glycol monomethyl ether obtained in Production Example 1, 450 parts by mass of methacrylic acid, 59 parts by mass of paratoluenesulfonic acid monohydrate, 0.5 part by mass of phenothiazine, and 265 parts by mass of cyclohexane as an azeotropic solvent, and esterification was performed by heating for 20 hours by separating condensation water while maintaining at 115° C. 556 Parts by mass of distilled water and 46 parts by mass of a 30% sodium hydroxide solution were added at an esterification rate of 99% (rate of conversion of alkylene glycol monomethyl ether), a temperature was raised again, cyclohexane was removed by azeotropy, and distilled water was added to obtain an aqueous solution of an ester 1 containing 70% of an ester and 10% of unreacted methacrylic acid.

PRODUCTION EXAMPLE 3

A reactor equipped with a thermometer, a stirrer, an addition apparatus, a nitrogen introducing tube, and a cooling tube was charged with 50 parts by mass of distilled water, and a temperature was raised to 80° C. Subsequently, a solution obtained by mixing 203 parts by mass of an aqueous solution of the ester 1 obtained in Production Example 2, 17.6 parts by mass of methacrylic acid, 76.6 parts by mass of distilled water and 2.8 parts by mass of 3-mercaptopropionic acid was added dropwise over 4 hours, and a solution obtained by mixing 47.9 parts by mass of distilled water and 2.1 parts by mass of ammonium persulfate was added dropwise over 5 hours. Thereafter, the material was aged for 1 hour while maintaining at 80° C., and cooled, a 30% aqueous sodium hydroxide solution was added to adjust a pH to 7, and distilled water was added to obtain an aqueous solution of a solid matter concentration of 20% containing a copolymer (A-1) having a weight average molecular weight of 14000, a peaktop molecular weight of 11000, 25% of a constitutional site (I) and 75% of a constitutional site (II). A constitutional site (I) contained in 100 g of a copolymer (A-1) is 0.23 mol.

PRODUCTION EXAMPLE 4

A reactor equipped with a thermometer, a stirrer, an addition apparatus, a nitrogen introducing tube and a cooling tube was charged with 50 parts by mass of distilled water, and a temperature was raised to 80° C. Subsequently, a solution obtained by mixing 203 parts by mass of an aqueous solution of the ester 1 obtained in Production Example 2, 17.6 parts by mass of methacrylic acid, 76.6 parts by mass of distilled water, and 3.1 parts by mass of 3-mercaptopropionic acid was added dropwise over 4 hours, and a solution obtained by mixing 27.9 parts by mass of distilled water and 0.6 part by mass of L-ascorbic acid, and a solution obtained by mixing 20.0 parts by mass of distilled water and 1.5 parts by mass of a 30% aqueous hydrogen peroxide solution were added dropwise over 5 hours. Thereafter, the material was aged for 1 hour while maintaining at 80° C., and cooled, a 30% aqueous sodium hydroxide solution was added to adjust a pH to 7, and distilled water was added to obtain an aqueous solution of a solid matter concentration of 20% containing a copolymer (B-1) having a weight average molecular weight of 13500, a peaktop molecular weight of 9000, 25% of a constitutional site (I) and 75% of a constitutional site (II). A constitutional site (I) contained in 100 g of a copolymer (B-1) is 0.23 mol.

PRODUCTION EXAMPLE 5

A reactor equipped with a thermometer, a stirrer, an addition apparatus, a nitrogen introducing tube and a cooling tube was charged with 50 parts by mass of distilled water, and a temperature was raised to 80° C. Subsequently, a solution obtained by mixing 203 parts by mass of an aqueous solution of the ester 1 obtained in Production Example 2, 17.6 parts by mass of methacrylic acid, 76.6 parts by mass of distilled water, and 2.2 parts by mass of 3-mercaptopropionic acid was added dropwise over 4 hours, and a solution obtained by mixing 47.9 parts by mass of distilled water and 2.1 parts by mass of ammonium persulfate was added dropwise over 5 hours. Thereafter, the material was aged for 1 hour while maintaining at 80° C., and cooled, a 30% aqueous sodium hydroxide solution was added to adjust a pH to 7, and distilled water was added to obtain an aqueous solution of a solid matter concentration of 20% containing a copolymer (A-2) having a weight average molecular weight of 20,000, a peaktop molecular weight of 14,000, 25% of a constitutional site (I) and 75% of a constitutional site (II). A constitutional site (I) contained in 100 g of a copolymer (A-2) is 0.23 mol.

EXAMPLES 1 TO 2, COMPARATIVE EXAMPLE 1

Copolymers (A-1), (B-1) and (A-2) obtained in Production Examples 3, 4 and 5 were mixed according to the formulation shown in Table 1 to obtain admixture for cements (1) to (2). In addition, a comparative admixture for cement (1) was obtained using only a copolymer (A-1).

Using admixture for cements (1) to (2) as Examples 1 to 2, and a comparative admixture for cement (1) as Comparative Example 1, they were blended into a mortar, and a mortar test was performed. Results of the mortar test are shown in Table 2.

TABLE 1

|  | Copolymer (A-1) (mass parts) | Copolymer (B-1) (mass parts) | Copolymer (A-2) (mass parts) | Solid matter concentration (mass %) |
|---|---|---|---|---|
| Admixture for cement (1) | 50 | 50 |  | 20 |
| Admixture for cement (2) |  | 50 | 50 | 20 |

TABLE 2

|  | Admixture for cement | Addition amount of admixture for cement (mass %/cement) | Initial flow value (mm) | Flow value after 30 minutes (mm) | Flow value after 60 minutes (mm) |
|---|---|---|---|---|---|
| Example 1 | Admixture for cement (1) | 0.15 | 200 | 195 | 180 |
| Example 2 | Admixture for cement (2) | 0.15 | 190 | 190 | 185 |
| Comparative Example 1 | Comparative admixture for cement (1) | 0.15 | 190 | 170 | 165 |

EXAMPLE 3

A reactor equipped with a thermometer, a stirrer, an addition apparatus, a nitrogen introducing tube and a cooling tube was charged with 121 parts by mass of distilled water, and a temperature was raised to 60° C. Subsequently, a first monomer component of 50.0 parts by mass of polyalkylene glycol monomethyl ether ($CH_3O$—$(C_2H_4O)_{10}$—$(C_3H_6O)_2$—$(C_2H_4O)_{13}$-)methacrylate, 6.2 parts by mass of methacrylic acid, 2.16 parts by mass of 3-mercaptopropionic acid, 1 part by mass of 30% sodium hydroxide, and 13.0 parts by mass of distilled water was added dropwise to a reaction vessel over 1 hour. Then, a second monomer component of 150.1 parts by mass of polyalkylene glycol monomethyl ether ($CH_3O$—$(C_2H_4O)_{10}$—$(C_3H_6O)_2$—$(C_2H_4O)_{13}$-)methacrylate, 18.5 parts by mass of methacrylic acid, 3.2 parts by mass of 30% sodium hydroxide, and 38.4 parts by mass of distilled water was added dropwise to a reaction vessel over 3 hours after completion of first monomer component addition. A mixed solution of 1.48 parts by mass of a 30% aqueous hydrogen peroxide solution and 48.52 parts by mass of distilled water, and a mixed solution of 0.57 part by mass of L-ascorbic acid and 49.43 parts by mass of distilled water were initiated to be added dropwise at the same time with initiation of addition of the first monomer component, and were added dropwise to a reaction vessel over 5 hours. Thereafter, the material was aged for 1 hour while maintain at 60° C., and cooled, and a 30% aqueous sodium hydroxide solution was added to adjust a pH to 7.0, to obtain an aqueous solution of a polymer (C-1) having a weight average molecular weight of 52800 and a peaktop molecular weight of 26600.

A lower molecular weight side area ratio P and a higher molecular weight side area ratio Q of the resulting polymer (C-1) were obtained, and results are shown in Table 3.

EXAMPLE 4

A reactor equipped with a thermometer, a stirrer, an addition apparatus, a nitrogen introducing tube and a cooling tube was charged with 116 parts by mass of distilled water, and a temperature was raised to 60° C. Subsequently, a first monomer component of 75.0 parts by mass of polyalkylene glycol monomethyl ether ($CH_3O$—$(C_2H_4O)_{10}$—$(C_3H_6O)_2$—$(C_2H_4O)_{13}$-)methacrylate, 9.3 parts by mass of methacrylic acid, 3.24 parts by mass of 3-mercaptopropionic acid, 1.6 parts by mass of 30% sodium hydroxide and 19.3 parts by mass of distilled water was added dropwise to a reaction vessel over 1.5 hours. Then, a second monomer component of 125.1 parts by mass of polyalkylene glycol monomethyl ether ($CH_3O$—$(C_2H_4O)_{10}$—$(C_3H_6O)_2$—$(C_2H_4O)_{13}$-)methacrylate, 15.5 parts by mass of methacrylic acid, 2.7 parts by mass of 30% sodium hydroxide, and 32.1 parts by mass of distilled water was added dropwise to a reaction vessel over 2.5 hours after completion of addition of the first monomer component. A mixed solution of 1.48 parts by mass of a 30% aqueous hydrogen peroxide, and 48.52 parts by mass of distilled water, and a mixed solution of 0.57 part by mass of L-ascorbic acid and 49.43 parts by mass of distilled water were initiated to be added dropwise at the same time with initiation of addition of the first monomer component, and were added dropwise to a reaction vessel over 5 hours. Thereafter, the material was aged for 1 hour while maintaining at 60° C., and cooled, and a 30% aqueous sodium hydroxide solution was added to adjust a pH to 7.0, to obtain an aqueous solution of a polymer (C-2) having a weight average molecular weight of 35300 and a peaktop molecular weight of 20200.

A lower molecular weight side area ratio P and a higher molecular weight side area ratio Q of the resulting polymer (C-2) were obtained, and results are shown in Table 3.

EXAMPLE 5

A reactor equipped with a thermometer, a stirrer, an addition apparatus, a nitrogen introducing tube and a cooling tube was charged with 1000 parts by mass of distilled water, and a temperature was raised to 80° C., Subsequently, a first monomer component of 213.4 parts by mass of polyalkylene glycol monomethyl ether ($CH_3O$—$(C_2H_4O)_{10}$—$(C_3H_6O)_2$—$(C_2H_4O)_{13}$-)methacrylate, 213.4 parts by mass of polyalkylene glycol monomethyl ether ($CH_3O$—$(C_2H_4O)_{25}$-)methacrylate, 112.7 parts by mass of methacrylic acid, 3.5 parts by mass of 3-mercaptopropionic acid, 26.3 parts by mass of 30% sodium hydroxide, and 162.6 parts by mass of distilled water was added dropwise to a reaction vessel over 2 hours. Then, a second monomer component of 320.0 parts by mass of polyalkylene glycol monomethyl ether ($CH_3O$—$(C_2H_4O)_{10}$—$(C_3H_6O)_2$—$(C_2H_4O)_{13}$-)methacrylate, 320.0 parts by mass of polyalkylene glycol monomethyl ether ($CH_3O$—$(C_2H_4O)_{25}$-)methacrylate, 169.1 parts by mass of methacrylic acid, 42.4 parts by mass of 3-mercaptopropionic acid, 39.5 parts by mass of 30% sodium hydroxide, and 206.8 parts by mass of distilled water was added dropwise to a reaction vessel over 2 hours after completion of addition of the first monomer component. In addition, a mixed solution of 11.5 parts by mass of sodium hydrogen persulfate and 138.5 parts by mass of distilled water was initiated to be added dropwise at the same time with initiation of addition of the first monomer component, and was added dropwise to the reaction vessel over 5 hours. Thereafter, the material was aged for 1 hour while maintaining at 80° C., and cooled, and a 30% aqueous sodium hydroxide solution was added to adjust a pH to 7.0, to obtain an aqueous solution of a polymer (C-3) having a weight average molecular weight of 37300 and a peaktop molecular weight of 16900.

Figure 3:
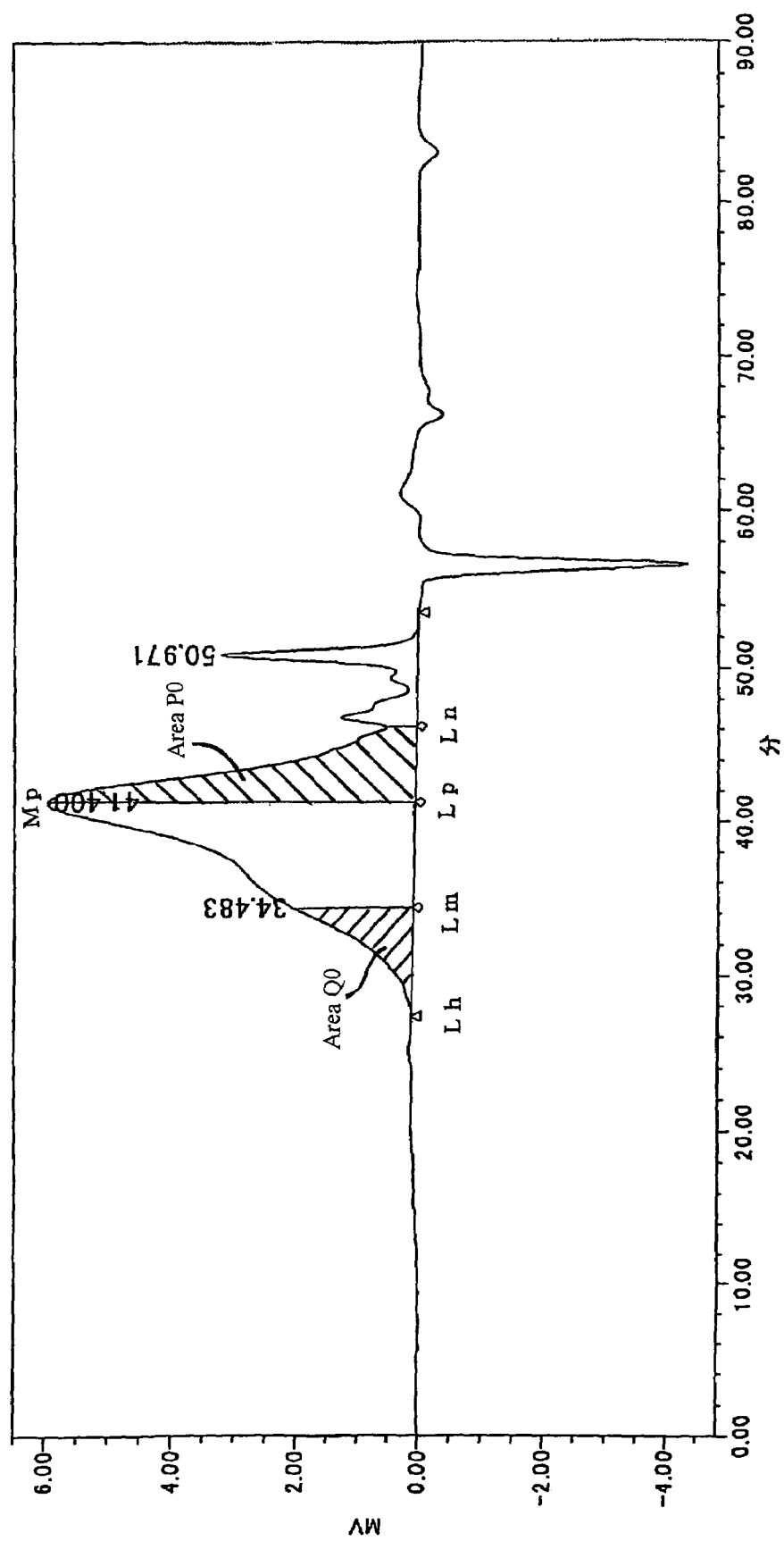
FIG. 3 is a GPC chart view of a polymer (C-3) obtained in Example 5.

A lower molecular weight side area ratio P and a higher molecular weight side area ratio Q of the resulting polymer (C-3) were obtained, and results are shown in Table 3. In addition, a GPC chart of the resulting polymer (C-3) is shown in FIG. 3.

COMPARATIVE EXAMPLE 2

A reactor equipped with a thermometer, a stirrer, an addition apparatus, a nitrogen introducing tube and a cooling tube was charged with 50 parts by mass of distilled water, and a temperature was raised to 80° C. Subsequently, a solution obtained by mixing 142.1 parts by mass of polyalkylene glycol monomethyl ether $(CH_3O—(C_2H_4O)_{10}—(C_3H_6O)_2—(C_2H_4O)_{13}-)$methacrylate, 37.7 parts by mass of methacrylic acid, 76.6 parts by mass of distilled water, and 2.8 parts by mass of 3-mercaptopropionic acid was added dropwise over 4 hours, and a solution obtained by mixing 47.9 parts by mass of distilled water and 2.1 parts by mass of ammonium persulfate was added dropwise over S hours. Thereafter, the material was aged for 1 hour while maintaining at 80° C., and cooled, and a 30% aqueous sodium hydroxide solution was added to adjust a pH to 7.0, to obtain an aqueous solution of a polymer (C-4) having a weight average molecular weight of 39000 and a peaktop molecular weight of 31700.

A lower molecular weight side area ratio P and a higher molecular weight side area ratio Q of the resulting polymer (C-4) were obtained, and results are shown in Table 3.

COMPARATIVE EXAMPLE 3

A reactor equipped with a thermometer, a stirrer, an addition apparatus, a nitrogen introducing tube and a cooling tube was charged with 115 parts by mass of distilled water, and a temperature was raised to 80° C. Subsequently, a solution (monomer component) obtained by mixing 273 parts by mass of polyalkylene glycol monomethyl ether $(CH_3O—(C_2H_4O)_{10}—(C_3H_6O)_2—(C_2H_4O)_{13}-)$methacrylate, 11.4 parts by mass of methacrylate, 11.2 parts by mass of distilled water, and 3.5 parts by mass of 3-mercaptopropionic acid was added dropwise over 4 hours, and a solution obtained by mixing 48.6 parts by mass of distilled water and 1.4 parts by mass of a 30% aqueous hydrogen peroxide solution, and a solution obtained by mixing 49.5 parts by mass of distilled water and 0.5 part by mass of L-ascorbic acid were added dropwise over 5 hours, respectively. Thereafter, the material was stirred for 1 hour while maintaining at 80° C., to complete polymerization. After cooling, a 30% aqueous sodium hydroxide solution was added to adjust a pH to 7.0 to obtain a polymer (C-5) having a weight average molecular weight of 34000 and a peaktop molecular weight of 28300.

A lower molecular weight side area ratio P and a higher molecular weight area ratio Q of the resulting polymer (C-5) were obtained, and results are shown in Table 3.

COMPARATIVE EXAMPLE 4

According to the same manner as that of Comparative Example 3 except that a solution obtained by mixing 203.1 parts by mass of polyalkylene glycol monomethyl ether $(CH_3O—(C_2H_4O)_{10}-)$methacrylate, 48.6 parts by mass of methaerylic acid, 6.9 parts by mass of sodium methacrylate, and 50.0 parts by mass of distilled water was used as a monomer component instead of the monomer component in Comparative Example 3, a polymer (C-6) having a weight average molecular weight of 71600 and a peaktop molecular weight of 51400 was obtained.

A lower molecular weight side area ratio P and a higher molecular weight side area ratio Q of the resulting polymer (C-6) were obtained, and results are shown in Table 3.

TABLE 3

| | Polymer | Lower molecular weight side area ratio P (%) | Higher molecular weight side area ratio Q (%) |
|---|---|---|---|
| Example 3 | (C-1) | 72.9 | 27.1 |
| Example 4 | (C-2) | 86.5 | 13.5 |
| Example 5 | (C-3) | 76.0 | 24.0 |
| Comparative Example 2 | (C-4) | 91.1 | 8.9 |
| Comparative Example 3 | (C-5) | 92.0 | 8.0 |
| Comparative Example 4 | (C-6) | 88.3 | 11.7 |

EXAMPLES 6 TO 8, COMPARATIVE EXAMPLE 5

Polymers (C-1), (C-2), (C-4) and (C-5) obtained in Examples 3 and 4, and Comparative Examples 2 and 3, and a polyalkylenimine alkylene oxide adduct (PEI-1) were mixed according to the formulation shown in Table 4, to obtain admixture for cements (3) to (4) and a comparative admixture for cement (2).

Using the admixture for cement (3) or (4) as Examples 6 to 8, and the comparative admixture for cement (2) as Comparative Example 5, a concrete test was performed under the test condition 1. Results are shown in Table 5.

TABLE 4

| | Polymer (C-1) (mass parts) | Polymer (C-2) (mass parts) | Polymer (C-4) (mass parts) | Polymer (C-5) (mass parts) | (PEI-1) (mass parts) |
|---|---|---|---|---|---|
| Admixture for cement (3) | 60 | | 30 | | 10 |
| Admixture for cement (4) | | 60 | 30 | | 10 |
| Comparative admixture for cement (2) | | | 30 | 60 | 10 |

PEI-1: Compound in which 10 mole of ethylene oxide, 6 mole of propylene oxide, and 10 mole of ethylene oxide were added in this order to active hydrogen of polyethylenimine having a molecular weight of 600

TABLE 5

|  | Admixture for cement | Addition amount of admixture for cement (mass %/cement) | Addition amount of MA 303 (mass %/cement) | Passed time (min) | Concrete temperature (° C.) | Slump (cm) | Flow value (mm) | Difference from flow value at 0 min (mm) | Air amount (volume %) |
|---|---|---|---|---|---|---|---|---|---|
| Example 6 | Admixture for cement (3) | 0.37 | 0 | 0 | 20.5 | 25.5 | 618 |  | 5.3 |
|  |  |  |  | 30 | 19 | >25.5 | 658 | 40 |  |
|  |  |  |  | 60 | 19 | >25.5 | 630 | 13 | 3.8 |
| Example 7 | Admixture for cement (3) | 0.36 | 0.2 | 0 | 20 | 25.5 | 615 |  | 5.3 |
|  |  |  |  | 30 | 19.5 | >25.5 | 688 | 73 |  |
|  |  |  |  | 60 | 19 | >25.5 | 643 | 28 | 3.8 |
| Example 8 | Admixture for cement (4) | 0.39 | 0.15 | 0 | 20.5 | 25 | 555 |  | 5.3 |
|  |  |  |  | 30 | 19.5 | 25.5 | 600 | 45 |  |
|  |  |  |  | 60 | 19 | 25 | 583 | 28 | 3.8 |
| Comparative Example 5 | Comparative admixture for cement (2) | 0.44 | 0 | 0 | 21 | 24.5 | 583 |  | 5.3 |
|  |  |  |  | 30 | 19.5 | 25 | 578 | −5 |  |
|  |  |  |  | 60 | 18 | 25 | 535 | −48 | 3.8 |

MA303: Air-entraining agent manufactured by NMB

In the concrete of Comparative Example 5, an addition amount of an admixture for cement for obtaining slump of 25 cm is 0.44 wt %, in Example 6, the amount is 0.37 wt %, in Example 7, the amount is 0.36 wt % and, in Example 8, the same slump can be obtained at a very small amount of 0.39 wt %.

In addition, in Comparative Example 5, decrease in a flow value after 30 minutes and 60 minutes is reduced as 5 mm and 48 mm, while in Example 6, the value is increased by 40 mm after 30 minutes, and the value is increased by 13 mm after 60 minutes. Further, also in Example 7 and Example 8, the value is increased by 73 mm or 45 mm after 30 minutes, and is increased by 28 mm or 28 mm after 60 minutes, thus, retainability of flow is very excellent.

PRODUCTION EXAMPLE 6

A reactor equipped with a thermometer, a stirrer, an addition apparatus, a nitrogen introducing tube and a cooling tube was charged with 592.8 parts by mass of distilled water, and a temperature was raised to 76° C. Subsequently, a monomer component of 1120.1 parts by mass of polyalkylene glycol monomethyl ether ($CH_3O$—$(C_2H_4O)_6$-)methacrylate, 294.4 parts by mass of methacrylic acid, 34.6 parts by mass of 3-mercaptopropionic acid, 68.5 parts by mass of 30% sodium hydroxide, and 59.2 parts by mass of distilled water was added dropwise to a reaction vessel over 5 hours. In addition, a mixed solution of 16.9 parts by mass of 30% aqueous hydrogen peroxide and 193.1 parts by mass of distilled water was initiated to be added dropwise at the same time with initiation of addition of the monomer component, and was added dropwise to a reaction vessel over 6 hours. In addition, a mixed solution of 6.6 parts by mass of L-ascorbic acid, and 203.4 parts by mass of distilled water was initiated to be added dropwise at the same time with initiation of addition of the monomer component, and was added dropwise to a reaction vessel over 6 hours. Thereafter, the material was aged for 1 hour while maintaining at 75° C., and cooled, and a 30% aqueous sodium hydroxide solution was added to adjust a pH to 7.0, to obtain an aqueous solution of a polymer (C-7).

EXAMPLES 9 TO 12, AND COMPARATIVE EXAMPLE 6

Polymers (C-3), (C-6) and (C-7) obtained in Example 5, Comparative Example 4 and Production Example 6, and polyalkylenimine alkylene oxide adducts (PEI-1) and (PEI-2) were mixed according to the formulation shown in Table 6, to obtain admixture for cements (5) to (8) and a comparative admixture for cement (3).

Using admixture for cements (5) to (8) as Examples 9 to 12, and the comparative admixture for cement (3) as Comparative Example 6, a concrete test was performed under the test condition 2. Results are shown in Table 7.

TABLE 6

|  | Polymer (C-3) (mass parts) | Polymer (C-6) (mass parts) | Polymer (C-7) (mass parts) | (PEI-1) (mass parts) | (PEI-2) (mass parts) |
|---|---|---|---|---|---|
| Admixture for cement (5) | 20 |  | 75 | 5 |  |
| Admixture for cement (6) | 20 |  | 65 |  | 15 |
| Admixture for cement (7) | 20 |  | 55 | 25 |  |
| Admixture for cement (8) | 25 |  | 65 | 10 |  |
| Comparative admixture for cement (3) |  | 20 | 70 |  | 10 |

PEI-1: Compound in which 10 mole of ethylene oxide, 6 mole of propylene oxide, and 10 mole of ethylene oxide were added in this order to active hydrogen of polyethylenimine having a molecular weight of 600

PEI-2: Compound in which 3 mole of ethylene oxide, 6 mole of propylene oxide, and 17 mole of ethylene oxide were added in this order to active hydrogen of polyethylenimine having a molecular weight of 600

TABLE 7

| | Admixture for cement | Addition amount of admixture for cement (mass %/cement) | Addition amount of MA 404 (mass %/cement) | Passed time (min) | Concrete temperature (° C.) | Slump (cm) | Flow value (mm) | Difference from flow value at 0 min (mm) | Air amount (volume %) |
|---|---|---|---|---|---|---|---|---|---|
| Example 9 | Admixture for cement (5) | 0.195 | 0.0018 | 0 | 20.0 | 22.5 | 403 | | 4.5 |
| | | | | 30 | 19.0 | 22.0 | 365 | −38 | 3.6 |
| | | | | 60 | 18.0 | 20.0 | 318 | −85 | 3.5 |
| Example 10 | Admixture for cement (6) | 0.20 | 0.0010 | 0 | 20.0 | 23.0 | 423 | | 5.1 |
| | | | | 30 | 19.0 | 22.0 | 383 | −40 | 5.0 |
| | | | | 60 | 18.0 | 22.0 | 348 | −75 | 4.1 |
| Example 11 | Admixture for cement (7) | 0.185 | 0.0014 | 0 | 19.5 | 22.5 | 398 | | 4.8 |
| | | | | 30 | 19.0 | 20.5 | 338 | −60 | 4.8 |
| | | | | 60 | 18.5 | 19.5 | 305 | −93 | 4.5 |
| Example 12 | Admixture for cement (8) | 0.185 | 0.0015 | 0 | 20.0 | 23.0 | 415 | | 4.2 |
| | | | | 30 | 18.5 | 21.5 | 358 | −57 | 3.8 |
| | | | | 60 | 18.0 | 20.5 | 320 | −95 | 3.1 |
| Comparative Example 6 | Comparative admixture for cement (3) | 0.18 | 0.0010 | 0 | 20.0 | 23.5 | 443 | | 4.6 |
| | | | | 30 | 19.0 | 22.0 | 380 | −63 | 3.8 |
| | | | | 60 | 19.5 | 22.0 | 330 | −113 | 3.5 |

MA404: Defoaming agent manufactured by NMB

In Comparative Example 6, decrease in a flow value after 30 minutes and 60 minutes is considerably reduced as 63 mm and 113 mm, while in Example 9, the value is reduced by 38 mm after 30 minutes, and by 85 mm after 60 minutes, in Example 10, the value is reduced by 40 mm after 30 minutes, and by 75 mm after 60 minutes, in Example 11, the value is reduced by 60 mm after 30 minutes, and by 93 mm after 60 minutes and, in Example 12, the value is reduced by 57 mm after 30 minutes, and by 95 mm after 60 minutes, thus, in all Examples, a decrease amount is smaller as compared with Comparative Example 6, and retainability of flow is excellent.

What is claimed is:

1. A polycarboxylic acid-based polymer for an admixture for cement, which is characterized in that a lower molecular weight side area ratio P defined by the following steps (1) to (6) is 50 to 87%:
   (1) performing a measurement by gel permeation chromatography (GPC), and obtaining a GPC chart;
   (2) drawing a baseline in a GPC chart, expressing by Lh an intersection point between a higher molecular weight side of the GPC chart and a baseline, and expressing by Ln an intersection point between a lower molecular weight side of the GPC chart and a baseline;
   (3) expressing by Lp an intersection point between a line which passes through i) a peak Mp (when there are plural peaks, a peak on a lowest molecular weight side) of a GPC chart and is vertical to a baseline, and ii) the baseline;
   (4) expressing by Lm a middle point between Lp and Lh;
   (5) expressing by P0 an area under a curve on a lower molecular weight side between Ln and Lp, and expressing by Q0 an area under a curve on a higher molecular weight side between Lh and Lm; and
   (6) defining a lower molecular weight side area ratio P (%) as P=(P0×100)/(P0+Q0).

2. The polycarboxylic acid-based polymer for an admixture for cement according to claim 1, wherein the polymer contains 2 to 90% by mass of a constitutional site (I) represented by the general formula (1):

$$\begin{array}{c} R^2 \quad R^1 \\ | \quad | \\ -\!\!+\!\!C\!-\!\!C\!\!+\!\!- \\ | \quad | \\ R^3 \quad COOM^1 \end{array} \quad (1)$$

(wherein $R^1$, $R^2$ and $R^3$ are the same or different, and represent a hydrogen atom, a methyl group or —$(CH_2)_Z$ $COOM^2$, Z represents a number of 0 to 2, wherein —$(CH_2)_Z$ $COOM^2$ may form an anhydride with —$COOM^1$ or —$(CH_2)_Z COOM^2$, and $M^1$ and $M^2$ are the same or different, and represent a hydrogen atom, an alkali metal atom, an alkaline earth metal atom, an ammonium group or an organic amine group.

3. The polycarboxylic acid-based polymer for an admixture for cement according to claim 2, wherein the polymer contains 2 to 98% by mass of a constitutional site (II) represented by the general formula (2):

$$\begin{array}{c} R^5 \quad R^4 \\ | \quad | \\ -\!\!+\!\!C\!-\!\!C\!\!+\!\!- \\ | \quad | \\ H \quad (CH_2)_x(CO)_y\!-\!O\!-\!(AO)_n\!-\!R^6 \end{array} \quad (2)$$

(wherein $R^4$ and $R^5$ are the same or different, and represent a hydrogen atom or a methyl group, AO represents one kind of an oxyalkylene group of a carbon number of 2 to 4, or a mixture of two or more kinds of the oxyalkylene groups and, in the case of two or more kinds of the groups, they may be added in a block manner or a random manner, x represents a number of 0 to 2, y represents 0 or 1, n represents an average addition mole number of an oxyalkylene group, and is a number of 1 to 300, and $R^6$ represents a hydrogen atom or a hydrocarbon group of a carbon number of 1 to 20).

4. The polycarboxylic acid-based polymer for an admixture for cement according to claim 3, wherein as the oxyalkylene chain in a constitutional site (II), an oxyalkylene chain containing an oxyalkylene group of a carbon number of 3 and/or 4 as a constitutional unit is contained as an essential component.

5. The polycarboxylic acid-based polymer for an admixture for cement according to claim 4, wherein an oxyalkylene chain containing an oxyalkylene group of a carbon number of 1 and/or 2 as a constitutional unit is bound to both ends of an oxyalkylene chain containing the oxyalkylene group of a carbon number of 3 and/or 4 as a constitutional unit.

6. An admixture for cement, comprising a polycarboxylic acid-based polymer for an admixture for cement as defined in claim 1 as an essential component.

7. The admixture for cement according to claim 6, wherein the polycarboxylic acid-based polymer for an admixture for cement as defined in claim 1 contains 2 to 90% by mass of a constitutional site (I) represented by the general formula (1), and 2 to 98% by mass of a constitutional site (II) represented by the general formula (2):

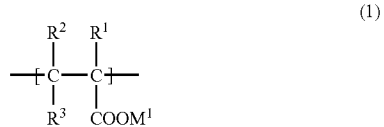

(wherein $R^1$, $R^2$ and $R^3$ are the same or different, and represent a hydrogen atom, a methyl group or $-(CH_2)_Z COOM^2$, Z represents a number of 0 to 2, wherein $-(CH_2)_Z COOM^2$ may form an anhydride with $-COOM^1$ or $-(CH_2) COOM^2$, and $M^1$ and $M^2$ are the same or different, and represent a hydrogen atom, an alkali metal atom, an alkaline earth metal atom, an ammonium group or an organic amine group)

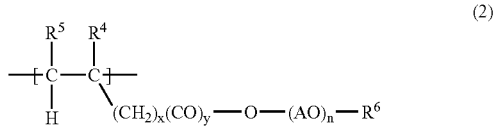

(wherein $R^4$ and $R^5$ are the same or different, and represent a hydrogen atom or a methyl group, AO represents one kind of an oxyalkylene group of a carbon number of 2 to 4, or a mixture of two or more kinds of the oxyalkylene groups and, in the case of two or more kinds of the groups, they may be added in a block manner or a random manner, x represents a number of 0 to 2, y represents 0 or 1, n represents an average addition mole number of an oxyalkylene group, and is a number of 1 to 300, and $R^6$ represents a hydrogen atom or a hydrocarbon group of a carbon number of 1 to 20.

8. The admixture for cement according to claim 7, wherein as the oxyalkylene chain in a constitutional site (II), an oxyalkylene chain containing an oxyalkylene group of a carbon number of 3 and/or 4 as a constitutional unit is contained as an essential component.

9. The admixture for cement according to claim 6, wherein a polycarboxylic acid-based polymer different from the polycarboxylic acid-based polymer for an admixture for cement as defined in claim 1 is contained.

10. The admixture for cement according to claim 6, wherein a polyalkylenimine alkylene oxide adduct is contained.

11. The admixture for cement according to claim 6, wherein a polycarboxylic acid-based polymer different from the polycarboxylic acid-based polymer for an admixture for cement as defined in claim 1, and a polyalkylenimine alkylene oxide adduct together with the polycarboxylic acid-based polymer for an admixture for cement as defined in claim 4 are contained, and a ratio to be contained is such that polycarboxylic acid-based polymer for an admixture for cement as defined in claim 4/polycarboxylic acid-based polymer different from a polycarboxylic acid-based polymer for an admixture for cement as defined in claim 4/polyalkylenimine alkylene oxide adduct=10 to 80/10 to 89/1 to 80 (ratio by mass).

12. A cement composition, comprising the admixture for cement as defined in claim 6, a cement and water as an essential component.

13. A producing method of a polycarboxylic acid-based polymer for an admixture for cement as defined in any one of claim 1 to claim 5 by radical-polymerizing a monomer component containing a monomer (I-M) represented by the general formula (3) as an essential component:

(wherein $R^1$, $R^2$ and $R^3$ are the same or different, and represent a hydrogen atom, a methyl group or $-(CH_2)_Z COOM^2$, Z represents a number of 0 to 2, wherein $-(CH_2)_Z COOM^2$ may form an anhydride with $-COOM^1$ or $-(CH_2)_Z COOM^2$, and $M^1$ and $M^2$ are the same or different, and represent a hydrogen atom, an alkali metal atom, an alkaline earth metal atom, an ammonium group or an organic amine group; and with the producing method being characterized by comprising the following steps of:

a) supplying a part of the monomer component into a reaction system together with an amount (TR-1) of a chain transfer agent, wherein said amount (TR-1) corresponds to 0.5 to 20% by mass of a total amount of the monomer component; and thereafter b) supplying a remainder of the monomer component into the reaction system together with an amount (TR-2) of a chain transfer agent, wherein said amount (TR-2) corresponds to 1-50% by mass of a total amount of the monomer component.

14. The producing method of a polycarboxylic acid-based polymer for an admixture for cement according to claim 13, wherein a mass ratio of an amount (TR-1) of a chain transfer agent used together with a part of the monomer component and an amount (TR-2) of a chain transfer agent used together with a remainder of the monomer component are (TR-2)/(TR-1)=1.5 to 20.

* * * * *